(12) United States Patent
Yamada

(10) Patent No.: US 10,880,555 B2
(45) Date of Patent: Dec. 29, 2020

(54) INFORMATION PROCESSING SYSTEM AND INFORMATION PROCESSING APPARATUS

(71) Applicant: FUJITSU LIMITED, Kawasaki (JP)

(72) Inventor: Kohji Yamada, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 144 days.

(21) Appl. No.: 16/167,580

(22) Filed: Oct. 23, 2018

(65) Prior Publication Data

US 2019/0132597 A1 May 2, 2019

(30) Foreign Application Priority Data

Oct. 30, 2017 (JP) ................................. 2017-209428

(51) Int. Cl.
| H04N 19/167 | (2014.01) |
| H04N 19/152 | (2014.01) |
| H04N 19/172 | (2014.01) |
| H04N 19/137 | (2014.01) |
| H04N 19/46 | (2014.01) |
| H04N 19/176 | (2014.01) |

(52) U.S. Cl.
CPC ......... *H04N 19/167* (2014.11); *H04N 19/137* (2014.11); *H04N 19/152* (2014.11); *H04N 19/172* (2014.11); *H04N 19/176* (2014.11); *H04N 19/46* (2014.11)

(58) Field of Classification Search
None
See application file for complete search history.

(56) References Cited

U.S. PATENT DOCUMENTS

| 5,751,363 | A | * | 5/1998 | Miyamoto | ........... | H04N 19/537 |
| | | | | | | 348/699 |
| 6,259,736 | B1 | * | 7/2001 | Chujoh | ................ | H04N 19/503 |
| | | | | | | 375/240.13 |
| 9,424,660 | B2 | * | 8/2016 | Wang | ........................ | G06T 9/00 |
| 2005/0138105 | A1 | * | 6/2005 | Lee | ..................... | H04N 21/8541 |
| | | | | | | 709/200 |

(Continued)

FOREIGN PATENT DOCUMENTS

| EP | 2487911 A1 * | 8/2012 | ........... G06F 3/1454 |
| JP | 2010-118976 | 5/2010 | |

(Continued)

*Primary Examiner* — Jayanti K Patel
*Assistant Examiner* — Stefan Gadomski
(74) *Attorney, Agent, or Firm* — Fujitsu Patent Center

(57) ABSTRACT

A transmission-side information processing apparatus includes, an updated region determination circuit that determines an inside of a frame to be determined as a moving image region and a still image region, a moving image encoding circuit that encodes the frame of the image by a moving image encoding scheme to generate a moving image stream when there is the moving image region in the frame to be determined, a still image encoding circuit that encodes a region switched from the moving image region to the still image region to generate a still image stream when there is the region switched from the moving image region to the still image region in the frame to be determined, and a transmission circuit that transmits region information indicating the moving image region and the still image region, the moving image stream and the still image stream to a reception-side information processing apparatus.

11 Claims, 13 Drawing Sheets

(56) References Cited

U.S. PATENT DOCUMENTS

| | | | |
|---|---|---|---|
| 2007/0195993 A1* | 8/2007 | Chen | G06T 7/194 382/103 |
| 2008/0152245 A1* | 6/2008 | El-Maleh | H04N 19/117 382/254 |
| 2009/0124387 A1* | 5/2009 | Perlman | A63F 13/335 463/42 |
| 2009/0154565 A1* | 6/2009 | Jeong | H04N 19/17 375/240.16 |
| 2010/0119157 A1* | 5/2010 | Kameyama | H04N 19/59 382/195 |
| 2010/0322523 A1* | 12/2010 | Mitsuhashi | H04N 19/17 382/218 |
| 2011/0129017 A1* | 6/2011 | Oami | G06F 16/5838 375/240.24 |
| 2011/0310965 A1 | 12/2011 | Nishibayashi et al. | |
| 2012/0002715 A1 | 1/2012 | Matsui et al. | |
| 2012/0005587 A1* | 1/2012 | Martin | G06F 3/1454 715/740 |
| 2012/0057748 A1* | 3/2012 | Katano | G06T 7/248 382/103 |
| 2012/0236199 A1 | 9/2012 | Imai et al. | |
| 2012/0269444 A1* | 10/2012 | Naito | H04N 5/23254 382/197 |
| 2013/0154990 A1* | 6/2013 | Hamada | G09G 5/003 345/173 |
| 2014/0089812 A1* | 3/2014 | Matsui | G06F 3/0481 715/738 |
| 2014/0147044 A1* | 5/2014 | Takada | G09G 5/393 382/173 |
| 2015/0229927 A1* | 8/2015 | Inada | H04N 19/167 375/240.08 |
| 2015/0229960 A1* | 8/2015 | Yamasaki | H04N 19/593 375/240.12 |
| 2016/0105690 A1* | 4/2016 | Denoual | H04N 21/845 375/240.02 |
| 2016/0155429 A1* | 6/2016 | Matsui | G06T 1/60 345/555 |
| 2016/0205409 A1* | 7/2016 | Park | H04N 19/17 375/240.12 |
| 2016/0239940 A1* | 8/2016 | Imai | G06F 3/0485 |
| 2016/0286222 A1 | 9/2016 | Kazui et al. | |
| 2016/0353150 A1* | 12/2016 | Hashimoto | H04N 21/478 |

FOREIGN PATENT DOCUMENTS

| | | |
|---|---|---|
| JP | 2012-014533 | 1/2012 |
| JP | 2012-195629 | 10/2012 |
| JP | 2016-184894 | 10/2016 |

* cited by examiner

[OPERATION OF INFORMATION PROCESSING SYSTEM WHEN REGION IS SWITCHED FROM STILL IMAGE REGION TO MOVING IMAGE REGION]

INFORMATION PROCESSING SYSTEM AND INFORMATION PROCESSING APPARATUS

CROSS-REFERENCE TO RELATED APPLICATION

This application is based upon and claims the benefit of priority of the prior Japanese Patent Application No. 2017-209428, filed on Oct. 30, 2017, the entire contents of which are incorporated herein by reference.

FIELD

The embodiments discussed herein are related to an information processing system and an information processing apparatus.

BACKGROUND

In recent years, an information processing system such as a thin client system has been widely distributed which causes a server apparatus connected to a client apparatus via a network to control a screen to be displayed on the client apparatus (see, e.g., Japanese Laid-open Patent Publication No. 2012-014533). For example, the thin client system executes an application in the server apparatus, and displays the execution result of the application in the client apparatus. In this type of thin client system, the server apparatus encodes an image and transmits the encoded image to the client apparatus.

For example, when an image to be transmitted to the client apparatus is encoded, the server apparatus switches and executes a still image encoding for encoding the image as a still image and a moving image encoding for encoding the image as a moving image according to, for example, a change in a network band. In the moving image encoding, the first frame is encoded by an in-screen prediction. As a result, an information amount after the encoding of the first frame in the moving image encoding increases, as compared with another frame encoded by an inter-screen prediction.

Here, for example, even when the first frame in the moving image encoding switched from the still image encoding is similar to the still image frame before the switching to the moving image encoding, the first frame in the moving image encoding is encoded by the in-screen prediction. In this case, in the first frame in the moving image encoding switched from the still image encoding and the still image frame before the switching to the moving image encoding, duplicated data is transmitted. As a result, a method has been proposed in which when the still image encoding is switched to the moving image encoding, the first frame in the moving image encoding is encoded by the in-screen prediction using the frame of the still image before the switching to the moving image encoding as a reference image (see, e.g., Japanese Laid-open Patent Publication Nos. 2012-195629, and 2016-184894).

Further, in a communication apparatus which is connected to a display apparatus that displays an image through a network, there has been suggested a communication method which lowers the frame rate of the moving image encoding when the area of a difference region in which the display content has been updated exceeds a threshold value (see, e.g., Japanese Laid-open Patent Publication No. 2010-118976).

Related techniques are disclosed in, for example, Japanese Laid-open Patent Publication Nos. 2012-014533, 2012-195629, 2016-184894, and 2010-118976.

SUMMARY

According to an aspect of the embodiments, a transmission-side information processing apparatus includes, an updated region determination circuit that determines an inside of a frame to be determined as a moving image region and a still image region, a moving image encoding circuit that encodes the frame of the image by a moving image encoding scheme to generate a moving image stream when there is the moving image region in the frame to be determined, a still image encoding circuit that encodes a region switched from the moving image region to the still image region to generate a still image stream when there is the region switched from the moving image region to the still image region in the frame to be determined, and a transmission circuit that transmits region information indicating the moving image region and the still image region, the moving image stream and the still image stream to a reception-side information processing apparatus.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

When a first frame in a moving image encoding is encoded by an in-screen prediction, a moving image encoding apparatus mounted on a server apparatus acquires a reference image to be used in the first frame from the outside. That is, the moving image encoding apparatus mounted on the server apparatus is designed to be able to acquire the reference image from the outside of the moving image encoding apparatus and encode the first frame by the inter-screen prediction. Further, in a universal moving image encoding apparatus, it is difficult to acquire a frame encoded by still image encoding as the reference image, and as a result, it is difficult to encode the first frame by the inter-screen prediction. In this case, since the first frame in the moving image encoding is encoded by the in-screen prediction, an information amount of a frame after the encoding increases, as compared with the case where the first frame is encoded by the inter-screen prediction. That is, when the still image encoding is switched to the moving image encoding, an information amount generated by the encoding of the image increases.

Hereinafter, an embodiment will be described with reference to the accompanying drawings.

Figure 1:
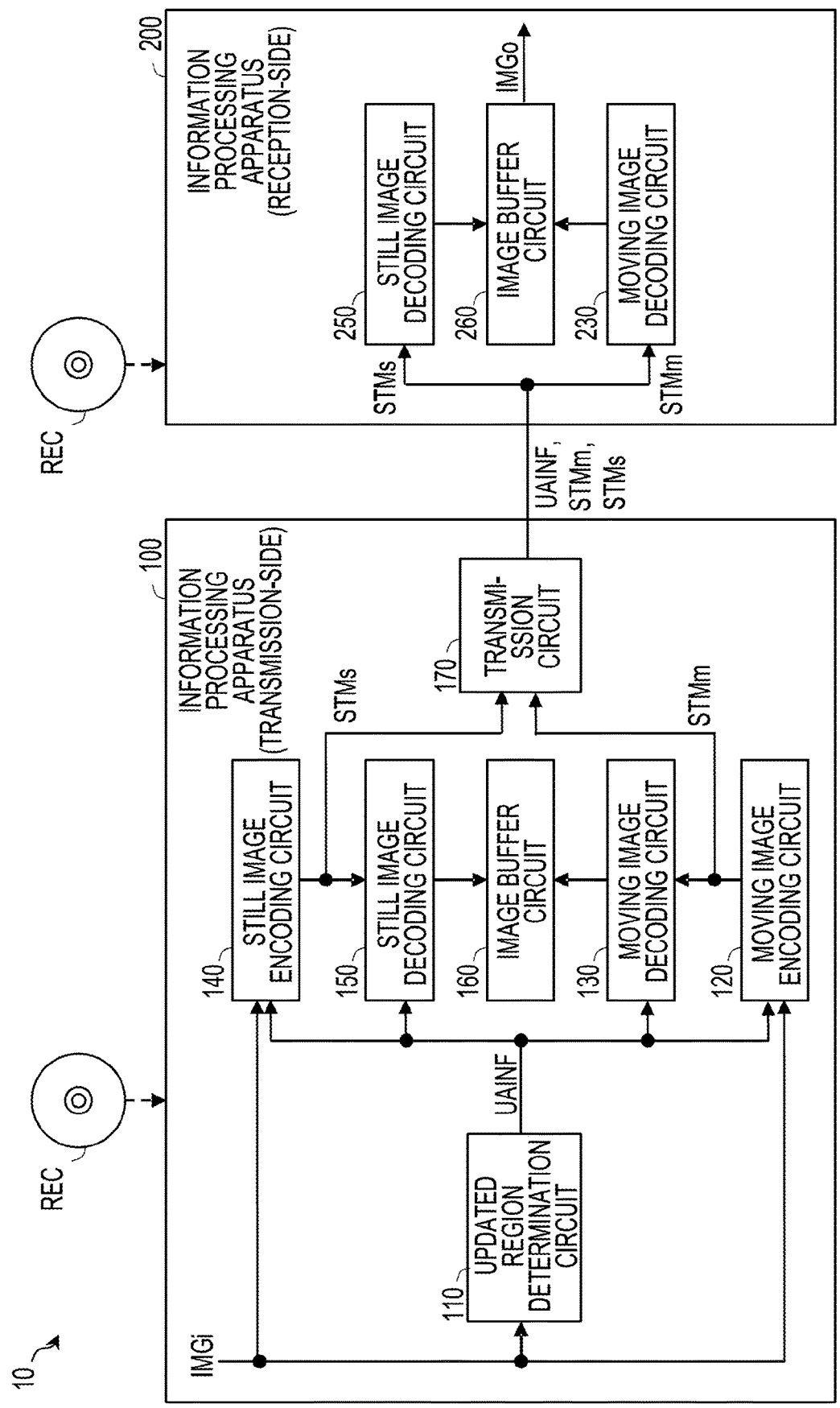
FIG. 1 is a diagram illustrating an embodiment of an information processing system, an information processing apparatus, and an information processing program.

FIG. 1 is a diagram illustrating an embodiment of an information processing system, an information processing apparatus, and an information processing program. The information processing system 10 illustrated in FIG. 1 is, for example, a thin client system. Further, the information processing system 10 is not limited to the thin client system. The information processing system 10 includes a transmission-side information processing apparatus 100 that encodes and transmits an image IMGi, and a reception-side information processing apparatus 200 that decodes the encoded image received from the transmission-side information processing apparatus 100 and displays the decoded image on a display screen. The information processing apparatus 200 is connected to an information processing apparatus 100 through, for example, a network. For example, in the case of the thin client system, the image IMGi illustrated in FIG. 1 is an image of a desk top screen of a virtual desktop environment constructed in a virtual machine on the information processing apparatus 100, and is generated by the information processing apparatus 100. Further, an image IMGo illustrated in FIG. 1 is an image displayed on the display screen of the information processing apparatus 200.

The information processing apparatus 100 is, for example, a server. For example, the information processing apparatus 100 includes an updated region determination circuit 110, a moving image encoding circuit 120, a moving image decoding circuit 130, a still image encoding circuit 140, a still image decoding circuit 150, an image buffer circuit 160, and a transmission circuit 170. Further, the updated region determination circuit 110, the moving image encoding circuit 120, the moving image decoding circuit 130, the still image encoding circuit 140, the still image decoding circuit 150, and the transmission circuit 170 may be implemented only by hardware, or may be implemented by controlling the hardware with software. For example, the updated region determination circuit 110, the moving image encoding circuit 120, the moving image decoding circuit 130, the still image encoding circuit 140, the still image decoding circuit 150, and the transmission circuit 170 may be implemented by executing, for example, an information processing program by a processor (not illustrated) included in the information processing apparatus 100. Further, the information processing program may be stored in a storage device such as a memory (not illustrated) in the information processing apparatus 100, or may be stored in a storage device outside the information processing apparatus 100. Further, the information processing program may be stored in a computer-readable recording medium REC such as a compact disc read only memory (CD-ROM), a digital versatile disc (DVD), or a universal serial bus (USB) memory. In this case, the information processing program stored in the recording medium REC is transmitted from the recording medium REC to, for example, a memory through an input/output interface (not illustrated) installed in the information processing apparatus 100. Further, the information processing program may be transmitted from the recording medium REC to a hard disk (not illustrated), and then, transmitted from the hard disk to the memory.

The updated region determination circuit 110 receives the image IMGi for each frame. Then, for each frame of the image IMGi, the updated region determination circuit 110 determines whether an updated region in which a display content displayed on the display screen of the information processing apparatus 200 has been updated is present in the image IMGi, based on a difference between a determination target frame and a previous frame of the determination target frame. In addition, the updated region determination circuit 110 determines the inside of the frame as a moving image region and a still image region. For example, the updated region determination circuit 110 determines a region where the image has been updated or a region which has been continuously updated a predetermined number of times or more, as the moving image region, and when the region has not been continuously updated a predetermined number of times or more, the updated region determination circuit 110 determines the region as the still image region. For example, in a case where the predetermined number of times is three times, a region that has been continuously updated three times or more is determined as the moving image region, and a region that has not been continuously updated three times or more (e.g., a region updated only twice consecutively, a region updated only once, or a non-updated region) is determined as the still image region. Further, the updated region determination circuit 110 detects a region switched from the moving image region to the still image region. Then, the updated region determination circuit 110 transmits region information UAINF indicating a position of the moving image region and a position of the region switched from the moving image region to the still image region, to the moving image encoding circuit 120, the moving image decoding circuit 130, the still image encoding circuit 140, and the still image decoding circuit 150.

The moving image encoding circuit 120 receives, for example, the image IMGi for each frame. Then, when the moving image region is detected, the moving image encoding circuit 120 encodes the full screen (full frame) of the image IMGi as the moving image to generate a moving image stream STMm. For example, when the moving image region is detected from the image IMGi, the moving image encoding circuit 120 encodes the frame (full screen) of the image IMGi in which the moving image region has been detected by a moving image encoding scheme, to generate the moving image stream STMm. The moving image encoding scheme is, for example, an encoding method based on the standard for the moving image encoding such as H.264 or high efficiency video coding (HEVC). Further, the moving image encoding scheme executed by the moving image encoding circuit 120 is not limited to the H.264 or the HEVC. Further, the moving image encoding circuit 120 transmits the moving image stream STMm to the moving image decoding circuit 130 and the transmission circuit 170. Further, the moving image encoding circuit 120 transmits the region information UAINF received from the updated region determination circuit 110, together with the moving image stream STMm to the transmission circuit 170. The moving image stream STMm and the region information UAINF which are transmitted to the transmission circuit 170 are transmitted to the reception-side information processing apparatus 200. Further, the region information UAINF may be transmitted from the updated region determination circuit 110 to the transmission circuit 170.

The moving image decoding circuit 130 decodes the moving image stream STMm received from the moving image encoding circuit 120 to generate a moving image decoded image. Further, when there is the moving image region, the moving image decoding circuit 130 extracts the region corresponding to the moving image region from the moving image decoded image generated by decoding the moving image stream STMm, based on the region information UAINF received from the updated region determination circuit 110. Then, the moving image decoding circuit 130 stores the image of the region extracted from the moving image decoded image in the image buffer circuit 160. The moving image decoding circuit 130 is an example of a first moving image decoding circuit.

The still image encoding circuit 140 receives, for example, the image IMGi for each frame. Then, when there is a region switched from the moving image region to the still image region, the still image encoding circuit 140 encodes the region switched from the moving image region to the still image region in the image IMGi to generate a still image stream STMs. For example, the still image encoding circuit 140 encodes a difference between the region corresponding to the region switched from the moving image region to the still image region in the image held in the image buffer circuit 160 and the region switched from the moving image region to the still image region in the image IMGi, to generate the still image stream STMs. Then, the still image encoding circuit 140 transmits the still image stream STMs to the still image decoding circuit 150 and the transmission circuit 170. The still image stream STMs transmitted to the transmission circuit 170 is transmitted to the reception-side information processing apparatus 200. Further, the still image encoding circuit 140 may encode the updated region in the image IMGi by a standardized scheme for a still image such as the Joint Photographic Experts Group (JPEG) scheme, instead of encoding the difference between the region switched from the moving image region to the still image region in the image IMGi and the image held in the image buffer circuit 160.

The still image decoding circuit 150 decodes the still image stream STMs received from the still image encoding circuit 140 to generate a still image decoded image of the updated region, and stores the generated still image decoded image in the image buffer circuit 160. The still image decoding circuit 150 is an example of a first still image decoding circuit.

As described above, the image buffer circuit 160 holds the image generated by decoding the encoded image (the moving image stream STMm or the still image stream STMs) transmitted to the reception-side information processing apparatus 200. That is, the image buffer circuit 160 holds an image which is the same as the image IMGo displayed on the reception-side information processing apparatus 200. The image buffer circuit 160 is an example of a first image buffer circuit.

When there is the moving image region, the transmission circuit 170 transmits the region information UAINF indicating the moving image region and the moving image stream STMm to the reception-side information processing apparatus 200. Further, when there is the region switched from the moving image region to the still image region, the transmission circuit 170 transmits the region information UAINF indicating the region switched from the moving image region to the still image region and the still image stream STMs, to the reception-side information processing apparatus 200.

As described above, when there is the moving image region, the moving image stream STMm is transmitted to the reception-side information processing apparatus 200. Further, when there is the region switched from the moving image region to the still image region, the still image stream STMs is transmitted to the reception-side information processing apparatus 200. Further, when there are both the moving image region and the region switched from the moving image region to the still image region, both the moving image stream STMm and the still image stream STMs are transmitted to the reception-side information processing apparatus 200.

Thus, even when the image IMGo to be displayed on the information processing apparatus 200 is switched from the image generated by decoding the still image stream STMs to the image generated by decoding the moving image stream STMm, the information processing apparatus 100 may execute the inter-screen prediction. That is, even when the updated region is switched from the still image region to the moving image region, the information processing apparatus 100 may encode the first frame to be switched to the moving image region by the inter-screen prediction.

Here, when the full frame (full screen) of the image IMGi is encoded by the moving image encoding scheme, an information amount (encoding amount) generated by encoding the updated region by the inter-screen prediction is smaller than that when the updated region is encoded by the in-screen prediction. Further, since there is no difference from the previous frame in regions other than the updated region, the information amount generated by the encoding is small enough to be negligible, as compared to that in the encoding of the updated region. That is, the information amount generated by encoding the full frame of the image IMGi by the inter-screen prediction is almost equal to that when only the updated region is encoded by the inter-screen prediction, and smaller than that when only the updated region is encoded by the in-screen prediction. Therefore, when the updated region is switched from the still image region to the moving image region, the information processing apparatus 100 may suppress an increase in information amount generated by encoding the image.

The information processing apparatus 200 is, for example, a client. For example, the information processing apparatus 200 includes a moving image decoding circuit 230, a still image decoding circuit 250, and an image buffer circuit 260. Further, the moving image decoding circuit 230 and the still image decoding circuit 250 may be implemented only by the hardware, or may be implemented by controlling the hardware with the software. For example, the moving image decoding circuit 230 and the still image decoding circuit 250 may be implemented by executing, for example, an information processing program by a processor (not illustrated) included in the information processing apparatus 200. Further, the information processing program may be stored in a storage device such as a memory (not illustrated) in the information processing apparatus 200, or may be stored in a storage device outside the information processing apparatus 200. Further, the information processing program may be stored in a computer-readable recording medium REC such as a CD-ROM, a DVD, or a USB memory. In this case, the information processing program stored in the recording medium REC is transmitted from the recording medium REC to, for example, a memory through an input/output interface (not illustrated) provided in the information processing apparatus 200. Further, the information processing apparatus 200 may be transmitted from the recording medium REC to a hard disk (not illustrated), and then, transmitted from the hard disk to the memory.

The moving image decoding circuit 230 is the same as or similar to the moving image decoding circuit 130. For example, the moving image decoding circuit 230 decodes the moving image stream STMm received from the transmission-side information processing apparatus 100 to generate a moving image decoded image. Further, when there is the moving image region, the moving image decoding circuit 230 extracts the region corresponding to the moving image region from the moving image decoded image generated by decoding the moving image stream STMm, based on the region information UAINF received from the transmission-side information processing apparatus 100. Then, the moving image decoding circuit 230 stores the image of the region extracted from the moving image decoded image in the image buffer circuit 260. Therefore, the screen of the moving image region is updated. The moving image decoding circuit 230 is an example of a second moving image decoding circuit, and the image buffer circuit 260 is an example of a second image buffer circuit. Further, the still image decoding circuit 250 to be described later is an example of a second still image decoding circuit.

The still image decoding circuit 250 is the same as or similar to the still image decoding circuit 150. When the information processing apparatus 200 receives the still image stream STMs from the transmission-side information processing apparatus 100, the still image decoding circuit 250 decodes the still image stream STMs to generate a still image decoded image of the region switched from the moving image region to the still image region, and stores the generated still image decoded image in the image buffer circuit 260. Therefore, the screen of the still image region is updated.

The information processing apparatus 200 displays the image IMGo held in the image buffer circuit 260 on a display screen (not illustrated). As described above, the image buffer circuit 260 holds the image IMGo to be displayed by the information processing apparatus 200 on the display screen. Further, configurations and operations of the information processing system 10 and the information processing apparatuses 100 and 200 are not limited to the example illustrated in FIG. 1.

Figure 2:
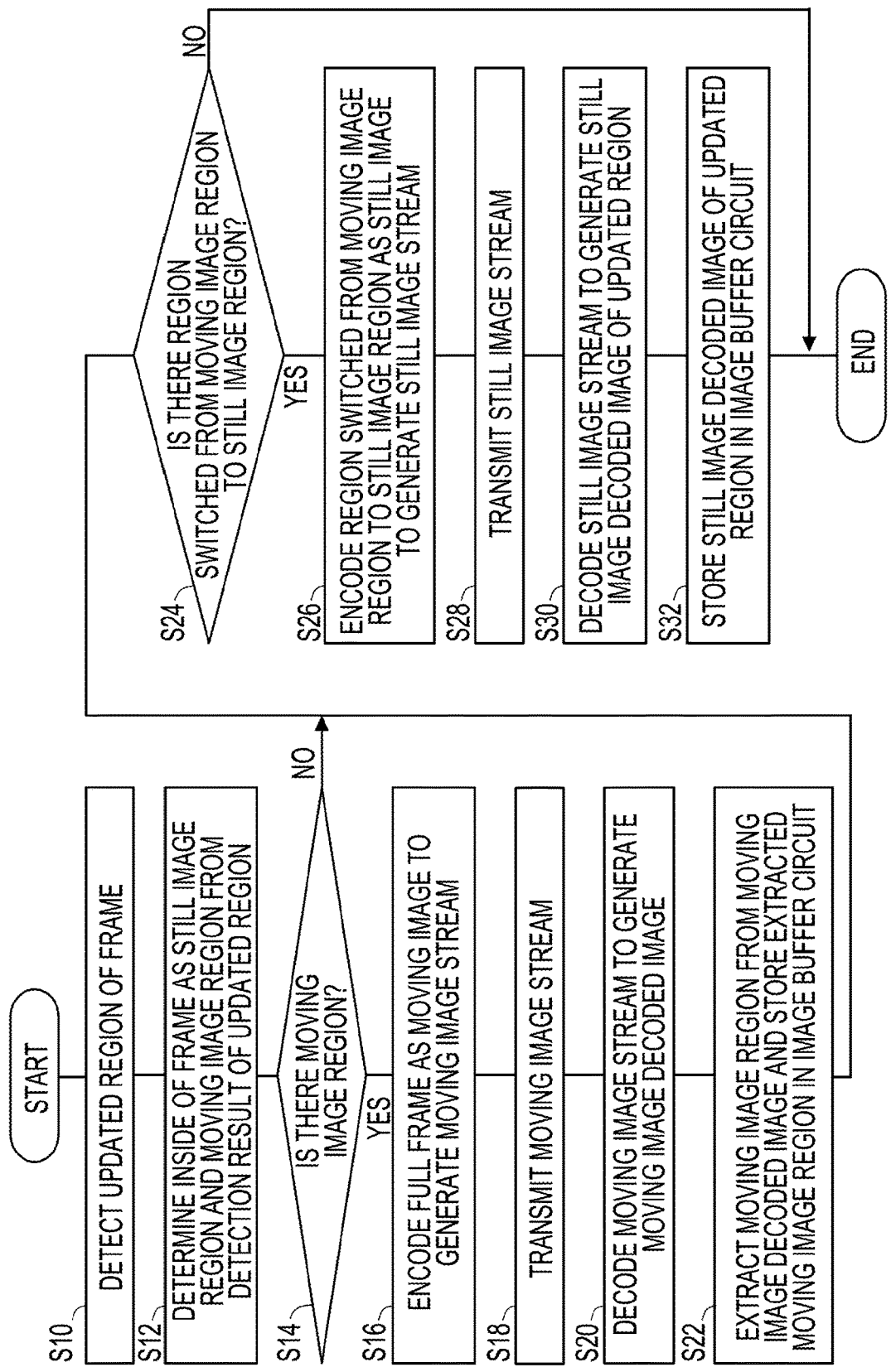
FIG. 2 is a diagram illustrating an example of an operation of a transmission-side information processing apparatus illustrated in FIG. 1.

FIG. 2 illustrates an example of the operation of the transmission-side information processing apparatus 100 illustrated in FIG. 1. Further, a program for causing the information processing apparatus 100 to execute the operation illustrated in FIG. 2 is an example of the information processing program.

In step S10, the updated region determination circuit 110 detects the updated region where the display content has been updated, from the frame (image IMGi). For example, when a region where the pixel value is different between a frame to be determined and a previous frame of the frame to be determined, the updated region determination circuit 110 determines the detected region as the updated region in the image IMGi. In this case, the updated region determination circuit 110 determines that the updated region is detected. Further, the updated region determination circuit 110 may determine a region (pixel) where the difference of the pixel value between the two frames is equal to or less than a predetermined value, as a region where the display content has not been updated. In addition, the updated region determination circuit 110 may determine that there is no updated region, when the number of regions (pixels) where the pixel value is different between the two frames are equal to or smaller than a predetermined number of pixels.

Next, in step S12, the updated region determination circuit 110 determines the inside of the frame as the moving image region and the still image region, based on the detection result of the updated region. For example, the updated region determination circuit 110 determines a region where the image has been updated or a region which has been continuously updated a predetermined number of times or more, as the moving image region, and when the updated region has not been continuously updated a predetermined number of times or more, the updated region determination circuit 110 determines the updated region as the still image region.

Next, in step S14, the updated region determination circuit 110 determines whether the moving image region is present in the frame. When it is determined that the moving image region is present in the frame, the operation of the information processing apparatus 100 moves to step S16. Meanwhile, when it is determined that no moving image region is present in the frame, the operation of the information processing apparatus 100 moves to step S24.

In step S16, the moving image encoding circuit 120 encodes the full frame of the image IMGi in which the updated region has been detected, as the moving image to generate the moving image stream STMm. For example, the moving image encoding circuit 120 encodes the full frame of the image IMGi in which the moving image region has been detected, by the inter-screen prediction to generate the moving image stream STMm.

Next, in step S18, the transmission circuit 170 transmits the region information UAINF indicating the moving image region detected in step S12 and the moving image stream STMm generated in step S16, to the reception-side information processing apparatus 200.

Next, in step S20, the moving image decoding circuit 130 decodes the moving image stream STMm generated in step S16 to generate the moving image decoded image. Therefore, the moving image decoded image of the full frame is generated.

Next, in step S22, the moving image decoding circuit 130 extracts the moving image region detected in step S12 from the moving image decoded image generated in step S20, and stores the extracted moving image region in the image buffer circuit 160. As a result, the moving image region in the image held in the image buffer circuit 160 is updated. Further, when there is no moving image region, the processing of step S24 is executed as described above.

Next, in step S24, the updated region determination circuit 110 determines whether there is the region switched from the moving image region to the still image region. For example, when the moving image region has not been continuously updated a predetermined number of times or more, the updated region determination circuit 110 determines that the moving image region is changed to the still image region. When it is determined that there is the region switched from the moving image region to the still image region, the operation of the information processing apparatus 100 moves to step S26. Meanwhile, when it is determined that there is no region switched from the moving image region to the still image region, the information processing apparatus 100 ends the operation.

In step S26, the still image encoding circuit 140 encodes the region detected as the region switched from the moving image region to the still image region in step S24, as the still image to generate the still image stream STMs. For example, the still image encoding circuit 140 encodes a difference between the region corresponding to the region switched from the moving image region to the still image region in the image held in the image buffer circuit 160 and the updated region of the image IMGi, to generate the still image stream STMs.

Next, in step S28, the transmission circuit 170 transmits the still image stream STMs generated in step S26 to the reception-side information processing apparatus 200. Further, as in step S18, the transmission circuit 170 transmits the region information UAINF indicating the region detected as the region switched from the moving image region to the still image region in step S24, together with the still image stream STMs to the reception-side information processing apparatus 200.

Next, in step S30, the still image decoding circuit 150 decodes the still image stream STMs generated in step S26 to generate the still image decoded image of the region switched from the moving image region to the still image region. For example, the still image decoding circuit 150 adds the image obtained by decoding the still image stream STMs and the region corresponding to the region switched from the moving image region to the still image region in the image held in the image buffer circuit 160. Therefore, the still image decoded image of the region switched form the moving image region to the still image region is generated.

Next, in step S32, the still image decoding circuit 150 stores the still image decoded image generated in step S30 in the image buffer circuit 160. Therefore, the still image region in the image held by the image buffer circuit 160 is updated, and the processing of encoding the region switched from the moving image region to the still image region is ended.

As described above, when the moving image region is present in the image IMGi, the information processing apparatus 100 encodes the full screen (full frame) of the image IMGi as the moving image to generate the moving image stream STMm, and transmits the generated moving image stream STMm to the reception-side information processing apparatus 200. When no moving image region is present in the image IMGi, the information processing apparatus 100 temporarily stops the encoding operation. Therefore, even when the moving image region is generated again in the frame, the information processing apparatus 100 may restart the encoding operation, so that the first frame switched to the moving image region may be encoded by the inter-screen prediction. Further, there is a small difference between the encoded image held in the moving image encoding circuit 120 and the moving image decoding circuit 130 before the encoding operation is stopped and the input image IMGi when the encoding operation is resumed because the region other than the region switched from the still image region to the moving image region is the still image region. As a result, there is a small difference in information amount between a case where only the moving image region is encoded and a case where the full screen is encoded. Therefore, when the updated region is switched from the still image region to the moving image region, the information processing apparatus 100 may suppress an increase in information amount generated by the encoding of an image. In addition, since the moving image encoding circuit 120 and the moving image decoding circuit 130 hold the last encoded image of the moving image region before becoming the still image region in an internal image buffer, it is possible to refer to a reference image of the first frame switched to the moving image region. As a result, the moving image encoding circuit 120 and the moving image decoding circuit 130 may be implemented by using a universal moving image encoding apparatus of which the internal operation is not changeable.

Further, the operation of the information processing apparatus 100 is not limited to the example illustrated in FIG. 2. For example, the processing of step S18 may be executed after the processing of step S20. Further, the processing of step S28 may be executed after the processing of step S30 or after the processing of step S32.

Figure 3:
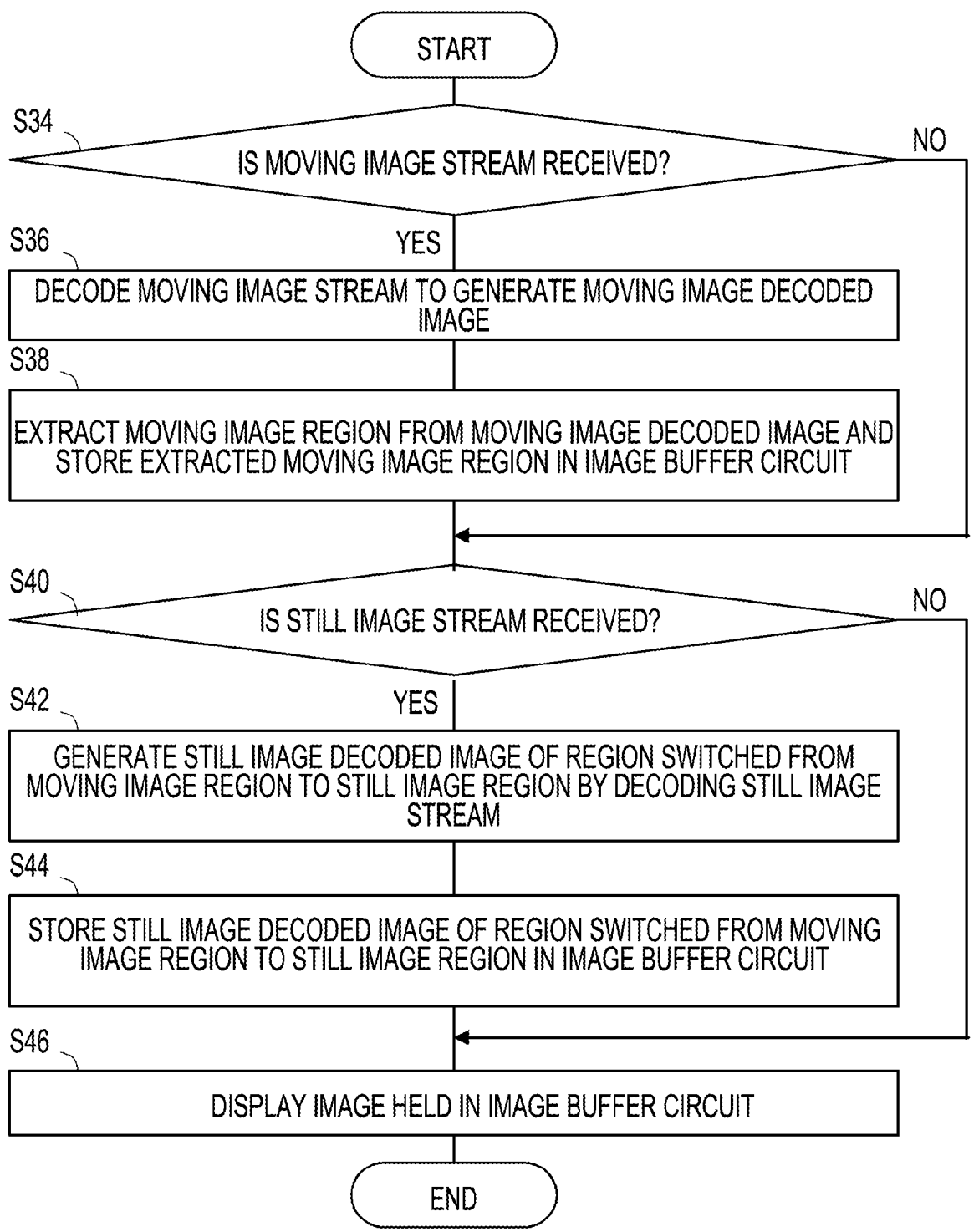
FIG. 3 is a diagram illustrating an example of an operation of a reception-side information processing apparatus illustrated in FIG. 1.

FIG. 3 illustrates an example of the operation of the reception-side information processing apparatus 200 illustrated in FIG. 1. Further, a program for causing the information processing apparatus 200 to execute the operation illustrated in FIG. 3 is an example of an information processing program.

In step S34, the information processing apparatus 200 determines whether the moving image stream STMm has been received from the transmission-side information processing apparatus 100. When it is determined that the moving image stream STMm has not been received, the information processing apparatus 200 moves the operation to step S40. Meanwhile, when it is determined that the moving image stream STMm has been received, the information processing apparatus 200 moves the operation to step S36. That is, each time the moving image stream STMm is received, the information processing apparatus 200 executes the processing of step S36.

In step S36, the moving image decoding circuit 230 decodes the moving image stream STMm received from the transmission-side information processing apparatus 100 to generate the moving image decoded image. Therefore, the moving image decoded image of the full frame is generated.

Next, in step S38, the moving image decoding circuit 230 extracts the moving image region indicated by the region information UAINF received from the information processing apparatus 100, from the moving image decoded image generated in step S36, and stores the extracted moving image region in the image buffer circuit 260. As a result, the moving image region in the image held in the image buffer circuit 260 is updated.

Next, in step S40, the information processing apparatus 200 determines whether the still image stream STMs has been received from the transmission-side information processing apparatus 100. When it is determined that the still image stream STMs has not been received, the information processing apparatus 200 moves the operation to step S46. Meanwhile, when it is determined that the still image stream STMs has been received, the information processing apparatus 200 moves the operation to step S42.

In step S42, the still image decoding circuit 250 decodes the still image stream STMs received from the transmission-side information processing apparatus 100 to generate the still image decoded image of the region switched from the moving image region to the still image region. For example, the still image decoding circuit 250 adds the image obtained by decoding the still image stream STMs and the region corresponding to the region switched from the moving image region to the still image region in the image held in the image buffer circuit 260. Therefore, the still image decoded image of the region switched from the moving image region to the still image region is generated.

Next, in step S44, the still image decoding circuit 250 stores the still image decoded image generated in step S42 in the image buffer circuit 260. As a result, the still image region in the image held in the image buffer circuit 260 is updated. After the processing of step S44 is executed, the operation of the information processing apparatus 200 moves to step S46.

In step S46, the information processing apparatus 200 displays the image IMGo held in the image buffer circuit 260 on the display screen. In this way, the information processing apparatus 200 receives the moving image stream STMm and the still image stream STMs, and displays the image IMGo including the display content updated by the information processing apparatus 100 (the moving image region and the region switched from the moving image region to the still image region).

As described above, when the display content of the image IMGo displayed on the display screen has been updated, the information processing apparatus 200 receives the moving image stream STMm from the transmission-side information processing apparatus 100 and decodes the moving image stream STMm to generate the moving image decoded image. Therefore, the moving image decoding circuit 230 may be implemented by using a universal moving image decoding apparatus of which the internal operation is not changeable. Further, the operation of the information processing apparatus 200 is not limited to the example illustrated in FIG. 3.

As described above, in the embodiment illustrated in FIGS. 1 to 3, when the still image encoding is switched to the moving image encoding, it is possible to suppress an increase in information amount generated by the encoding of an image. For example, when the moving image region is detected from the image IMGi, the information processing apparatus 100 encodes the full frame of the image IMGi in which the moving image region has been detected, as the moving image to generate the moving image stream STMm, and transmits the moving image stream STMm to the reception-side information processing apparatus 200. Further, when there is the region switched from the moving image region to the still image region, the information processing apparatus 100 encodes the region switched from the moving image region to the still image region to generate the still image stream STMs, and transmits the still image stream STMs to the reception-side information processing apparatus 200.

As described above, in the information processing apparatus 100, the full frame is encoded as the moving image when the moving image region is present in the image IMGi, so that when the still image region is switched to the moving image region, the first frame switched to the moving image region may be encoded by the inter-screen prediction. Therefore, when the updated region is switched from the still image region to the moving image region, the information processing apparatus 100 may suppress an increase in information amount generated by the encoding of an image. Since the still image region before the updated region is switched to the moving image region is also encoded as the moving image region, the reference image of the first frame switched to the moving image region may be generated by decoding the image obtained by encoding the still image region as the moving image. As a result, the moving image encoding circuit 120 and the moving image decoding circuit 130 may be implemented by using a universal moving image encoding apparatus of which the internal operation is not changeable. That is, even when the universal moving image encoding apparatus of which the internal operation is not changeable is mounted on the information processing apparatus 100, it is possible to suppress the increase in information amount generated by the encoding of an image when the updated region is switched from the still image region to the moving image region. Similarly, the moving image decoding circuit 230 may be implemented by using the universal moving image decoding apparatus of which the internal operation is not changeable.

Figure 4:
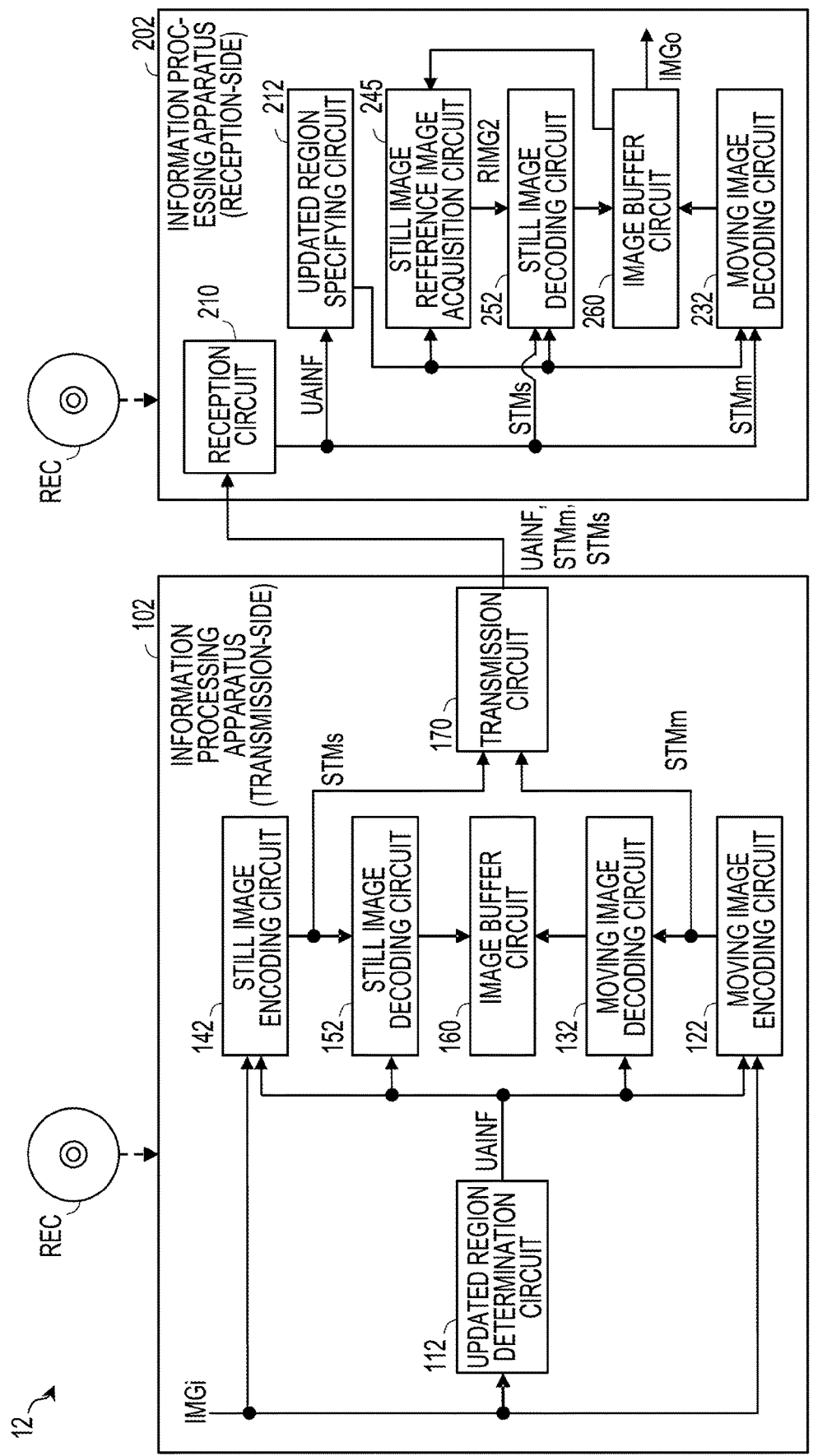
FIG. 4 is a diagram illustrating another embodiment of the information processing system, an information processing apparatus, and an information processing program.

FIG. 4 is a diagram illustrating another embodiment of the information processing system, the information processing apparatus, and the information processing program. The components that are the same as or similar to those described in FIGS. 1 to 3 will be denoted by the same or similar reference numerals as used in FIGS. 1 to 3, and detailed descriptions thereof will be omitted. The information processing system 12 illustrated in FIG. 4 is, for example, the thin client system. Further, the information processing system 12 is not limited to the thin client system.

The information processing system 12 includes information processing apparatuses 102 and 202, in place of the information processing apparatuses 100 and 200 illustrated in FIG. 1.

The information processing apparatus 102 is an information processing apparatus such as a transmission-side server that encodes and transmits the image IMGi. For example, the information processing apparatus 102 includes an updated region determination circuit 112, a moving image encoding circuit 122, a moving image decoding circuit 132, a still image encoding circuit 142, a still image decoding circuit 152, an image buffer circuit 160, and a transmission circuit 170. Further, the updated region determination circuit 112, the moving image encoding circuit 122, the moving image decoding circuit 132, the still image encoding circuit 142, the still image decoding circuit 152, and the transmission circuit 170 may be implemented only by hardware or may be implemented by controlling the hardware with software. For example, the updated region determination circuit 112, the moving image encoding circuit 122, the moving image decoding circuit 132, the still image encoding circuit 142, the still image decoding circuit 152, and the transmission circuit 170 may be implemented by executing, for example, an information processing program by a processor (not illustrated) included in the information processing apparatus 102.

The updated region determination circuit 112, the moving image encoding circuit 122, the moving image decoding circuit 132, the still image encoding circuit 142, and the still image decoding circuit 152 are the same as or similar to the updated region determination circuit 110, the moving image encoding circuit 120, the moving image decoding circuit 130, the still image encoding circuit 140, and the still image decoding circuit 150 illustrated in FIG. 1. The moving image decoding circuit 132 is an example of the first moving image decoding circuit, and the still image decoding circuit 152 is an example of the first still image decoding circuit. Further, details of the updated region determination circuit 112, the moving image encoding circuit 122, the moving image decoding circuit 132, the still image encoding circuit 142, and the still image decoding circuit 152 will be described with reference to FIG. 5. The image buffer circuit 160 and the transmission circuit 170 are the same as or similar to the image buffer circuit 160 and the transmission circuit 170 illustrated in FIG. 1.

The information processing apparatus 202 is an information processing apparatus such as a reception-side client that decodes and displays the encoded image received from the transmission-side information processing apparatus 102. For example, in the information processing apparatus 202, a reception circuit 210, an updated region specifying circuit 212, and a still image reference image acquisition circuit 245 are added to the information processing apparatus 200 illustrated in FIG. 1. Further, the information processing apparatus 202 includes a moving image decoding circuit 232 and a still image decoding circuit 252, in place of the moving image decoding circuit 230 and the still image decoding circuit 250 illustrated in FIG. 1. The other components of the information processing apparatus 202 are the same as or similar to those of the information processing apparatus 200 illustrated in FIG. 1.

For example, the information processing apparatus 202 includes a reception circuit 210, an updated region specifying circuit 212, a moving image decoding circuit 232, a still image reference image acquisition circuit 245, a still image decoding circuit 252, and an image buffer circuit 260. Further, the reception circuit 210, the updated region specifying circuit 212, the moving image decoding circuit 232, the still image reference image acquisition circuit 245, and the still image decoding circuit 252 may be implemented only by the hardware or implemented by controlling the hardware with the software. For example, the reception circuit 210, the updated region specifying circuit 212, the moving image decoding circuit 232, the still image reference image acquisition circuit 245, and the still image decoding circuit 252 may be implemented by executing, for example, an information processing program, by a processor (not illustrated) included in the information processing apparatus 202.

The reception circuit 210 receives, for example, the moving image stream STMm and the region information UAINF which are transmitted from the transmission-side information processing apparatus 102, and stores, for example, the moving image stream STMm received from the information processing apparatus 102 in, for example, a reception buffer circuit (not illustrated). In addition, the reception circuit 210 transmits the moving image stream STMm received from the information processing apparatus 102 to the moving image decoding circuit 232, and transmits the region information UAINF received from the information processing apparatus 102 to the updated region specifying circuit 212. Further, when the still image stream STMs is received from the information processing apparatus 102, the reception circuit 210 transmits the still image stream STMs to the still image decoding circuit 252.

The updated region specifying circuit 212 specifies, for example, the position of the moving image region and the position of the region switched from the moving image region to the still image region, based on the region information UAINF. Then, the updated region specifying circuit 212 notifies, for example, the moving image decoding circuit 232 of, for example, the position of the moving image region. For example, when there is the moving image region, the updated region specifying circuit 212 outputs information indicating, for example, the position of the moving image region to the moving image decoding circuit 232. Further, for example, when there is the region switched from the moving image region to the still image region, the updated region specifying circuit 212 outputs information indicating, for example, the position of the still image region (the region switched from the moving image region to the still image region) to the still image reference image acquisition circuit 245 and the still image decoding circuit 252.

Based on the information received from the updated region specifying circuit 212 (the information indicating, for example, the position of the still image region), the still image reference image acquisition circuit 245 acquires the image of the region corresponding to the still image region (the region switched from the moving image region to the still image region) from the image held by the image buffer circuit 260 as a reference image RIMG 2. In addition, the still image reference image acquisition circuit 245 transmits the reference image RIMG2 acquired from the image held by the image buffer circuit 260 to the still image decoding circuit 252. The reference image RIMG2 is an example of a second reference image.

The moving image decoding circuit 232, the still image decoding circuit 252, and the image buffer circuit 260 are the same as or similar to the moving image decoding circuit 230, the still image decoding circuit 250, and the image buffer circuit 260 illustrated in FIG. 1. The moving image decoding circuit 232 is an example of the second moving image decoding circuit, and the still image decoding circuit 252 is an example of the second still image decoding circuit. Details of the moving image decoding circuit 232 and the still image decoding circuit 252 will be described with reference to FIG. 6. Further, the configurations of the information processing system 12 and the information processing apparatuses 102 and 202 are not limited to the example illustrated in FIG. 4.

Figure 5:
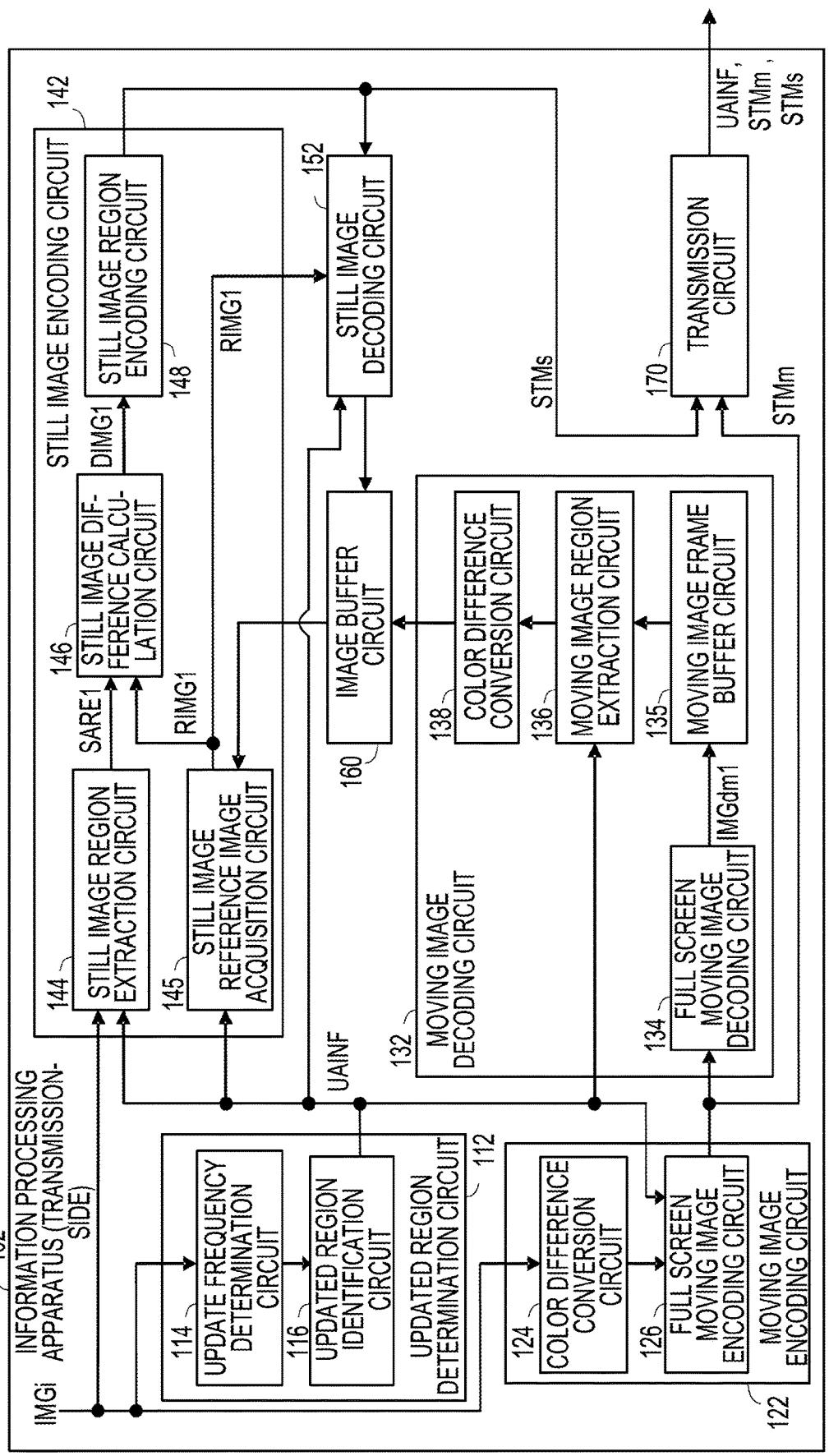
FIG. 5 is a diagram illustrating an example of a transmission-side information processing apparatus illustrated in FIG. 4.

FIG. 5 illustrates an example of the transmission-side information processing apparatus 102 illustrated in FIG. 4. As described in FIG. 4, the information processing apparatus 102 includes an updated region determination circuit 112, a moving image encoding circuit 122, a moving image decoding circuit 132, a still image encoding circuit 142, a still image decoding circuit 152, an image buffer circuit 160, and a transmission circuit 170. In the example illustrated in FIG. 5, a color difference format of the image IMGi to be encoded is a 4:4:4 format in which color difference components are not extracted.

The updated region determination circuit 112 includes an update frequency determination circuit 114 and an updated region identification circuit 116. For example, the update frequency determination circuit 114 determines an update frequency for each region (for each pixel) of the image IMGi at a predetermined time interval (e.g., for each frame). In addition, the update frequency determination circuit 114 outputs information indicating the update frequency for each region to the updated region identification circuit 116. The updated region identification circuit 116 identifies the screen of the image IMGi as the moving image region and the still image region based on the update frequency for each region of the image IMGi. For example, the updated region identification circuit 116 determines that a region where the update frequency is equal to or more than a predetermined value is the moving image region. Further, the updated region identification circuit 116 determines that a region where the non-update frequency is equal to or more than a predetermined value is the still image region. In addition, the updated region determination circuit 116 transmits the region information UAINF indicating the position of the moving image region and the position of the region switched from the moving image region to the still image region, to the moving image encoding circuit 122, the moving image decoding circuit 132, the still image encoding circuit 142, and the still image decoding circuit 152.

The moving image encoding circuit 122 includes a color difference conversion circuit 124 and a full screen moving image encoding circuit 126. The color difference conversion circuit 124 converts a color difference format of the image IMGi from the 4:4:4 format into the 4:2:0 format, and transmits the image IMGi converted into the 4:2:0 format to the full screen moving image encoding circuit 126. Further, the color difference conversion circuit 124 may convert the color difference format of the image IMGi into the 4:2:2 format, and transmit the image IMGi converted into the 4:2:2 format to the full screen moving image encoding circuit 126. The image IMGi of the 4:2:0 format and the image IMGi of the 4:2:2 format are images acquired by extracting the color difference components.

When the moving image region is present in the image IMGi, the full screen moving image encoding circuit 126 encodes the full screen (full frame) of the image IMGi received from the color difference conversion circuit 124 as the moving image to generate the moving image stream STMm. For example, the full screen moving image encoding circuit 126 acquires the reference image from the moving image frame buffer circuit 135, which will be described later, and encodes the frame (full screen) of the image IMGi converted into the 4:2:0 format by the moving image encoding scheme to generate the moving image stream STMm. The moving image encoding scheme executed by the full screen moving image encoding circuit 126 is, for example, an encoding method based on the standard for the moving image encoding such as H.264 or HEVC. Further, the moving image encoding scheme executed by the full screen moving image encoding circuit 126 is not limited to the H.264 or the HEVC.

The moving image stream STMm generated by the full screen moving image encoding circuit 126 is transmitted to the moving image decoding circuit 132 and the transmission circuit 170. Further, the full screen moving image encoding circuit 126 transmits the region information UAINF received from the updated region identification circuit 116, together with the moving image stream STMm to the transmission circuit 170. The moving image stream STMm and the region information UAINF which are transmitted to the transmission circuit 170 are transmitted to the reception-side information processing apparatus 202. Further, the region information UAINF may be transmitted from the updated region determination circuit 116 to the transmission circuit 170.

As described above, the moving image encoding circuit 122 converts the image IMGi to be encoded in the 4:4:4 format into an image acquired by extracting the color difference components, and encodes the frame of the image IMGi acquired by extracting the color difference components by the moving image encoding scheme to generate the moving image stream STMm.

The moving image decoding circuit 132 includes the full screen moving image decoding circuit 134, the moving image frame buffer circuit 135, the moving image region extraction circuit 136, and the color difference conversion circuit 138. The full screen moving image decoding circuit 134 acquires the reference image from the moving image frame buffer circuit 135, and decodes the moving image stream STMm received from the full screen moving image encoding circuit 126 to generate a moving image decoded image IMGdm1. Then, the full screen moving image decoding circuit 134 stores the moving image decoded image IMGdm1 in the moving image frame buffer circuit 135. The moving image decoded image IMGdm1 held in the moving image frame buffer circuit 135 may be used as the reference image when a subsequent frame is decoded.

The moving image region extraction circuit 136 extracts the region corresponding to the moving image region indicated by the region information UAINF received from the updated region identification circuit 116, from the moving image decoded image IMGdm1 held in the moving image frame buffer circuit 135. Then, the moving image region extraction circuit 136 transmits the image of the region extracted from the moving image decoded image IMGdm1 to the color difference conversion circuit 138.

The color difference conversion circuit 138 converts the color difference format of the image received from the moving image region extraction circuit 136 (the image of the updated region in the moving image decoded image IMGdm1) from the 4:2:0 format into the 4:4:4 format. Then, the color difference conversion circuit 138 stores the image converted into the 4:4:4 format (the image of the moving image region in the moving image decoded image IMGdm1) in the image buffer circuit 160. As a result, the moving image region in the image held in the image buffer circuit 160 is updated.

As described above, the moving image decoding circuit 132 extracts the region corresponding to the moving image region from the moving image decoded image IMGdm1 generated by decoding the moving image stream STMm, and converts the color difference format of the image of the extracted region into the 4:4:4 format. Then, the moving image decoding circuit 132 stores the image converted into the 4:4:4 format in the image buffer circuit 160.

The still image encoding circuit 142 encodes a still image region SARE1 to be encoded (the region switched from the moving image region to the still image region) in the image IMGi to be encoded of the 4:4:4 format to generate the still image stream STMs. For example, the still image encoding circuit 142 includes a still image region extraction circuit 144, a still image reference image acquisition circuit 145, a still image difference calculation circuit 146, and a still image region encoding circuit 148.

The still image region extraction circuit 144 extracts a still image region SARE1 to be encoded (the region switched from the moving image region to the still image region), which is indicated by the region information UAINF received from the updated region identification circuit 116, from the image IMGi in the 4:4:4 format. Then, the still image region extraction circuit 144 transmits the image of the still image region SARE1 extracted from the image IMGi to the still image difference calculation circuit 146.

Based on the region information UAINF received from the updated region identification circuit 116, the still image reference image acquisition circuit 145 acquires the image of the region corresponding to the still image region SARE1 to be encoded (the region switched from the moving image region to the still image region) as the reference image RIMG1 from the image held in the image buffer circuit 160. Then, the still image reference image acquisition circuit 145 transmits the reference image RIMG1 acquired from the image held by the image buffer circuit 160 to the still image difference calculation circuit 146. The reference image RIMG1 is an example of the first reference image.

The still image difference calculation circuit 146 calculates a difference between the image of the still image region SARE1 to be encoded received from the still image region extraction circuit 144 and the reference image RIMG1 received from the still image reference image acquisition circuit 145, and generates the difference image DIMG1. Then, the still image difference calculation circuit 146 transmits the difference image DIMG1 to the still image region encoding circuit 148.

The still image region encoding circuit 148 encodes the difference image DIMG1 to generate the still image stream STMs. Then, the still image region encoding circuit 148 transmits the still image stream STMs to the still image decoding circuit 152 and the transmission circuit 170.

The still image decoding circuit 152 decodes the still image stream STMs received from the still image region encoding circuit 148 to generate the still image decoded image of the region switched from the moving image region to the still image region, and stores the generated still image decoded image in the image buffer circuit 160. For example, the still image decoding circuit 152 adds the reference image RIMG1 received from the still image reference image acquisition circuit 145 to the image obtained by decoding the still image stream STMs, to generate the still image decoded image of the updated region.

The transmission circuit 170 transmits the region information UAINF received from the full screen moving image encoding circuit 126, the moving image stream STMm when there is the moving image region, and the still image stream STMs when there is the region switched from the moving image region to the still image region, to the reception-side information processing apparatus 202.

When the moving image region is detected, the information processing apparatus 102 encodes the image IMGi as the moving image by using the reference image acquired from the moving image frame buffer inside the full-screen moving image encoding circuit 126 (the same image as the moving image decoded image IMGdm1 of the previous frame) (in the universal moving image encoding apparatus, the encoded image is decoded in the apparatus and several frames are held as the reference image), and decodes the moving image stream STMm by using the reference image acquired form the moving image frame buffer circuit 135 (the moving image decoded image IMGdm1 of the previous frame). As a result, the information processing apparatus 102 may implement the full screen moving image encoding circuit 126 and the full screen moving image decoding circuit 134 by using the universal moving image encoding apparatus.

Further, the configuration of the information processing apparatus 102 is not limited to the example illustrated in FIG. 5. For example, the color difference conversion circuit 138 may convert the color difference format of the moving image decoded image IMGdm1 into the 4:4:4 format before the moving image region extraction circuit 136 extracts the region corresponding to the updated region from the moving image decoded image IMGdm1 of the 4:2:0 format. In this case, the moving image region extraction circuit 136 may extract the region corresponding to the updated region from the moving image decoded image IMGdm1 converted from the 4:2:0 format into the 4:4:4 format, and store the image of the extracted region in the image buffer circuit 160.

Figure 6:
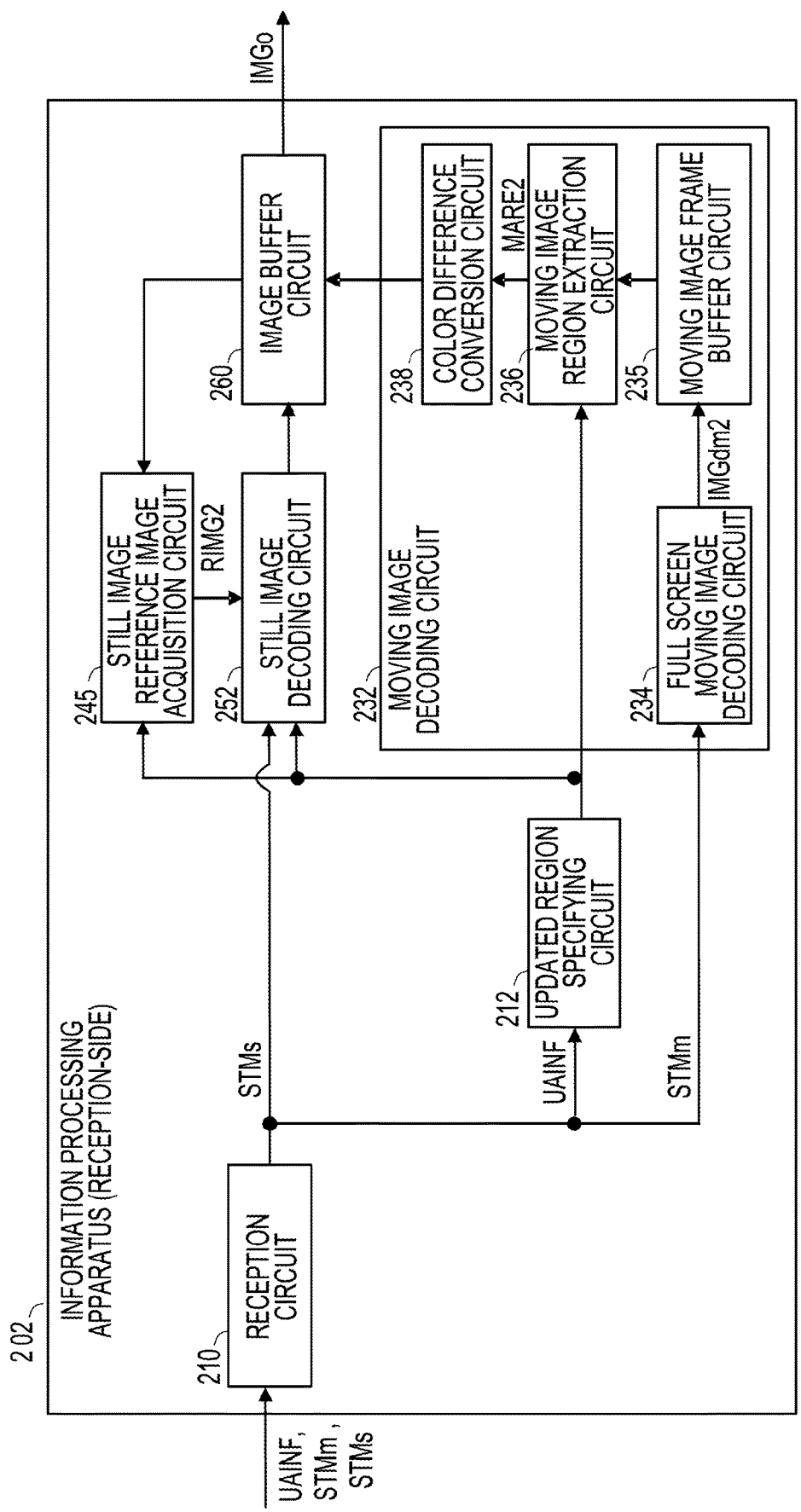
FIG. 6 is a diagram illustrating an example of a reception-side information processing apparatus illustrated in FIG. 4.

FIG. 6 illustrates an example of the reception-side information processing apparatus 202 illustrated in FIG. 4. As described in FIG. 4, the information processing apparatus 202 includes a reception circuit 210, an updated region specifying circuit 212, a moving image decoding circuit 232, a still image reference image acquisition circuit 245, a still image decoding circuit 252, and an image buffer circuit 260. In FIG. 6, the moving image decoding circuit 232 and the still image decoding circuit 252 of which descriptions have been omitted in FIG. 4 will be described.

The moving image decoding circuit 232 is the same as or similar to the moving image decoding circuit 132 of the transmission-side information processing apparatus 102. For example, the moving image decoding circuit 232 includes the full screen moving image decoding circuit 234, the moving image frame buffer circuit 235, the moving image region extraction circuit 236, and the color difference conversion circuit 238.

The full screen moving image decoding circuit 234 acquires the reference image from the moving image frame buffer circuit 235, and decodes the moving image stream STMm received from the reception circuit 210 to generate a moving image decoded image IMGdm2. Then, the full screen moving image decoding circuit 234 stores the moving image decoded image IMGdm2 in the moving image frame buffer circuit 235. The color difference format of the moving image decoded image IMGdm2 is the 4:2:0 format when the moving image stream STMm is generated by encoding the image IMGi of the 4:2:0 format. Further, the moving image decoded image IMGdm2 held in the moving image frame buffer circuit 235 may be used as the reference image when a subsequent frame is decoded.

The moving image region extraction circuit 236 extracts a moving image region MARE2 indicated by the information received from the updated region specifying circuit 212 from the moving image decoded image IMGdm2 held in the moving image frame buffer circuit 235. Then, the moving image region extraction circuit 236 transmits the image of the moving image region MARE2 extracted from the moving image decoded image IMGdm2 to the color difference conversion circuit 238.

The color difference conversion circuit 238 converts the color difference format of the image of the moving image region MARE2 received from the moving image region extraction circuit 236 from the 4:2:0 format into the 4:4:4 format. Then, the color difference conversion circuit 238 stores the image of the moving image region MARE2 converted into the 4:4:4 format in the image buffer circuit 260. As a result, the moving image region in the image held in the image buffer circuit 260 is updated.

As described above, the moving image decoding circuit 232 extracts the region corresponding to the updated region from the moving image decoded image IMGdm2 generated by decoding the moving image stream STMm, and converts the color difference format of the image of the extracted region into the 4:4:4 format. Then, the moving image decoding circuit 232 stores the image converted into the 4:4:4 format in the image buffer circuit 260.

The still image decoding circuit 252 decodes the still image stream STMs received from the reception circuit 210 to generate the still image decoded image of the region switched from the moving image region to the still image region, and stores the generated still image decoded image in the image buffer circuit 260. For example, the still image decoding circuit 252 adds the reference image RIMG2 received from the still image reference image acquisition circuit 245 to the image obtained by decoding the still image stream STMs, to generate the still image decoded image of the region switched from the moving image region to the still image region.

Each time the moving image stream STMm is received from the information processing apparatus 102, the information processing apparatus 202 decodes the moving image stream STMm using the reference image acquired from the moving image frame buffer circuit 235 (the moving image decoded image IMGdm2 of the previous frame). Therefore, the information processing apparatus 202 may implement the full screen moving image decoding circuit 234 using the universal moving image decoding apparatus.

Further, the configuration of the information processing apparatus 202 is not limited to the example illustrated in FIG. 6. For example, the color difference conversion circuit 238 may convert the color difference format of the moving image decoded image IMGdm2 into the 4:4:4 format before the moving image region extraction circuit 236 extracts the moving image region MARE2 from the moving image decoded image IMGdm2 of the 4:2:0 format. In this case, the moving image region extraction circuit 236 may extract the moving image region MARE2 from the moving image decoded image IMGdm2 converted from the 4:2:0 format into the 4:4:4 format, and store the image of the extracted moving image region MARE2 in the image buffer circuit 260.

Figure 7:
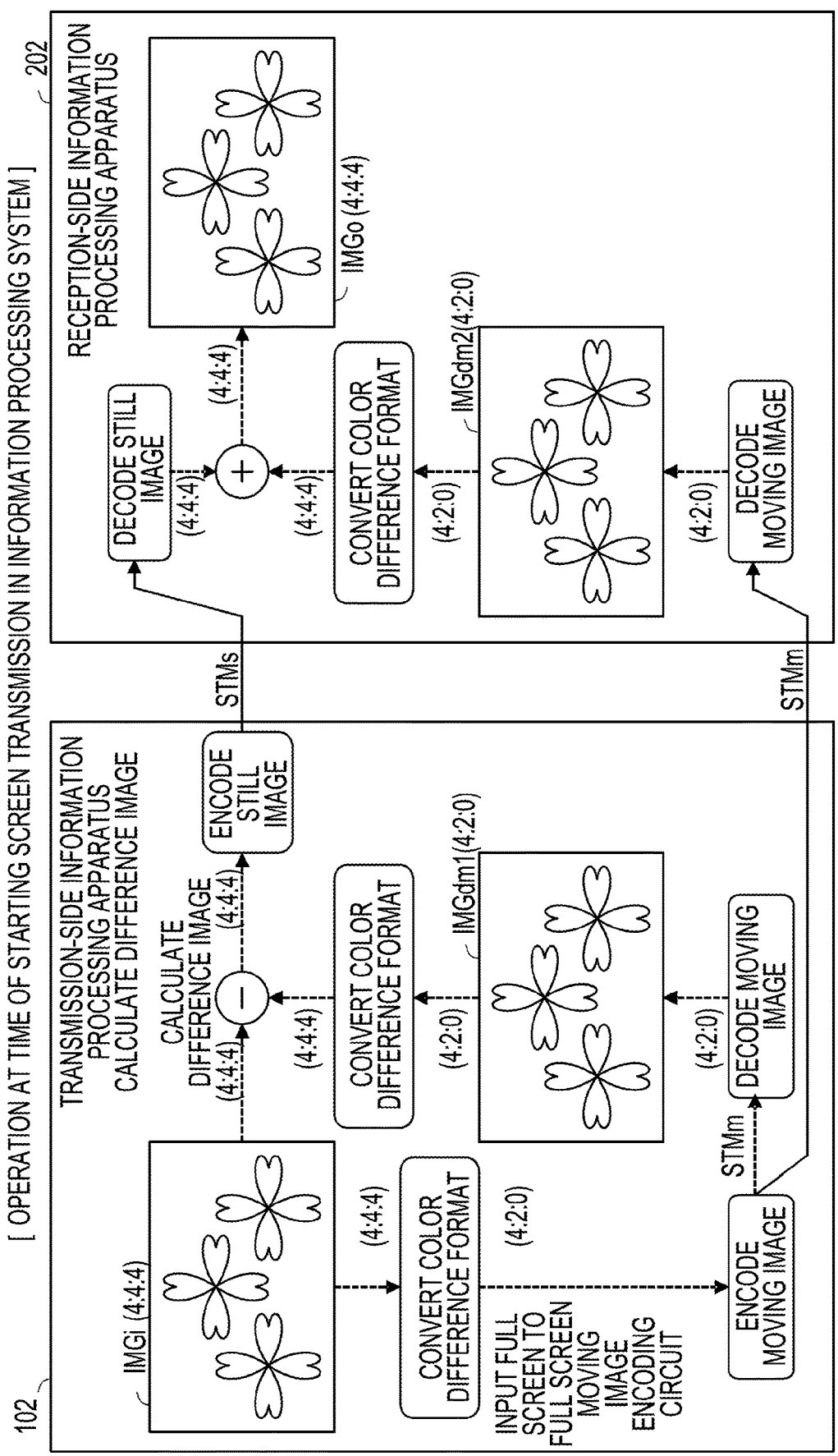
FIG. 7 is a view illustrating an example of an operation of the information processing system illustrated in FIG. 4.

FIG. 7 illustrates an example of the operation of the information processing system 12 illustrated in FIG. 4. The operation illustrated in FIG. 7 is an operation at the time of starting the screen transmission by the information processing system 12. The formats "4:4:4" and "4:2:0" in the parentheses illustrated in FIG. 7 indicate the color difference formats of the image to be processed.

When the image to be initially displayed is transmitted to the reception-side information processing apparatus 202, the transmission-side information processing apparatus 102 first converts the image IMGi of the 4:4:4 format into the image IMGi of the 4:2:0 format, and encodes the frame of the converted image IMGi as the moving image. For example, the color difference conversion circuit 124 converts the color difference format of the image IMGi to be encoded from the 4:4:4 format into the 4:2:0 format. Then, the full screen of the image IMGi converted into the 4:2:0 format is input as the image to be encoded for the moving image to the full screen moving image encoding circuit 126. The full screen moving image encoding circuit 126 encodes the frame (full screen) of the image IMGi converted into the 4:2:0 format by the in-screen prediction to generate the moving image stream STMm. Then, the full screen moving image encoding circuit 126 transmits the moving image stream STMm to the full screen moving image decoding circuit 134, and simultaneously, transmits the moving image stream STMm to the reception-side information processing apparatus 202 via the transmission circuit 170.

The full screen moving image decoding circuit 134 decodes the moving image stream STMm to generate the moving image decoded image IMGdm1 of the 4:2:0 format. Then, the moving image region extraction circuit 136 transmits the entire region (full screen) of the moving image decoded image IMGdm1 of the 4:2:0 format to the color difference conversion circuit 138. The color difference conversion circuit 138 converts the color difference format of the moving image decoded image IMGdm1 from the 4:2:0 format into the 4:4:4 format, and stores the moving image decoded image IMGdm1 of the 4:4:4 format in the image buffer circuit 160.

Further, the still image reference image acquisition circuit 145 acquires the moving image decoded image IMGdm1 of the 4:4:4 format held in the image buffer circuit 160, and transmits the obtained moving image decoded image IMGdm1 as the reference image to the still image difference calculation circuit 146. The moving image decoded image IMGdm1 of the 4:4:4 format acquired from the image buffer circuit 160 by the still image reference image acquisition circuit 145 is an example of a third reference image.

The still image difference calculation circuit 146 calculates the difference between the image IMGi of the 4:4:4 format received from the still image region extraction circuit 144 and the moving image decoded image IMGdm1 of the 4:4:4 format received from the still image reference image acquisition circuit 145, to generate the difference image. The region extracted by the still image region extraction circuit 144 at the time of starting the screen transmission is the entire region (full screen) of the image IMGi. Therefore, at the time of starting the screen transmission, the difference image between the full screen of the image IMGi of the 4:4:4 format and the moving image decoded image IMGdm1 of the 4:4:4 format is generated.

Then, the still image region encoding circuit 148 encodes the difference image between the full screen of the image IMGi of the 4:4:4 format and the moving image decoded image IMGdm1 of the 4:4:4 format to generate the still image stream STMs. The still image region encoding circuit 148 transmits the still image stream STMs to the reception-side information processing apparatus 202 via the transmission circuit 170.

Therefore, the information processing apparatus 102 may suppress the increase in the information amount (the amount of information to be transmitted to the information processing apparatus 202) of the moving image stream STMm and the still image stream STMs at the time of starting the screen transmission.

The reception-side information processing apparatus 202 executes the moving image decoding processing, which is the same as or similar to the moving image decoding processing of the moving image stream STMm by the transmission-side information processing apparatus 102, on the moving image stream STMm received from the information processing apparatus 102. As a result, the moving image decoded image IMGdm2 of the 4:2:0 format is generated, and the generated moving image decoded image IMGdm2 is stored in the image buffer circuit 260 after the color difference format thereof is converted from the 4:2:0 format into the 4:4:4 format.

The still image reference image acquisition circuit 245 acquires the moving image decoded image IMGdm2 of the 4:4:4 format held in the image buffer circuit 260, and transmits the acquired moving image decoded image IMGdm2 as the reference image to the still image decoding circuit 252. The moving image decoded image IMGdm2 of the 4:4:4 format acquired from the image buffer circuit 260 by the still image reference image acquisition circuit 245 is an example of a fourth reference image.

The still image decoding circuit 252 adds the moving image decoded image IMGdm2 received from the still image reference image acquisition circuit 245 to the difference image obtained by decoding the still image stream STMs received from the information processing apparatus 102, to generate the still image decoded image of the full screen of the 4:4:4 format. Then, the still image decoding circuit 252 stores the still image decoded image of the full screen of the 4:4:4 format in the image buffer circuit 260. As a result, the still image decoded image of the full screen of the 4:4:4 format held in the image buffer circuit 260 is displayed as the image IMGo on the display screen of the information processing apparatus 202. Further, the operation at the time of starting the screen transmission of the information processing system 12 is not limited to the example illustrated in FIG. 7.

Figure 8:
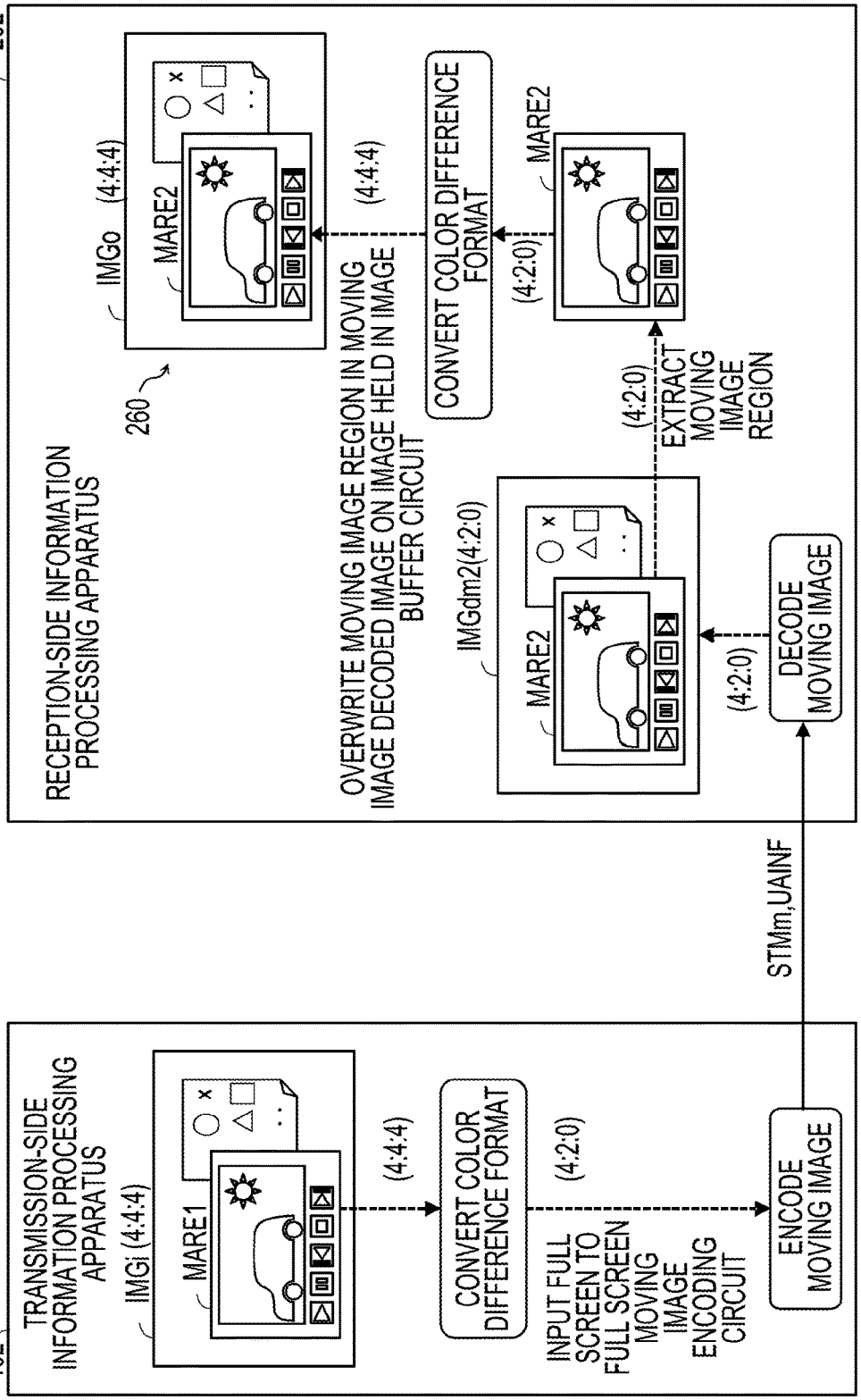
FIG. 8 is a view illustrating another example of the operation of the information processing system illustrated in FIG. 4.

FIG. 8 illustrates another example of the operation of the information processing system 12 illustrated in FIG. 4. The operation illustrated in FIG. 8 is the operation of the information processing system 12 when the updated region is switched from the still image region to the moving image region. The formats "4:4:4" and "4:2:0" in the parentheses illustrated in FIG. 8 indicate the color difference formats of the image to be processed.

The color difference conversion circuit 124 of the transmission-side information processing apparatus 102 converts the color difference format of the image IMGi to be encoded from the 4:4:4 format into the 4:2:0 format. Then, the full screen of the image IMGi converted into the 4:2:0 format is input as the image to be encoded for the moving image to the full screen moving image encoding circuit 126. The full screen moving image encoding circuit 126 encodes the frame (full screen) of the image IMGi converted into the 4:2:0 format by the inter-screen prediction to generate the moving image stream STMm. Then, the full screen moving image encoding circuit 126 transmits the region information UAINF indicating, for example, the position of the moving image region MARE1 and the moving image stream STMm to the reception-side information processing apparatus 202 via the transmission circuit 170. Even when the updated region is switched from the still image region to the moving image region, the information processing apparatus 102 may encode the moving image region by the inter-screen prediction, so that the increase in the information amount of the moving image stream STMm may be suppressed.

Further, although not illustrated, the moving image stream STMm is also transmitted to the moving image decoding circuit 132, and the same or similar moving image decoding processing as the moving image decoding processing by the information processing apparatus 202, which will be described later, is executed on the moving image stream STMm.

The full screen moving image decoding circuit 234 of the reception-side information processing apparatus 202 decodes the moving image stream STMm received from the transmission-side information processing apparatus 102 to generate the moving image decoded image IMGdm2 of the 4:2:0 format. Then, the full screen moving image decoding circuit 234 stores the moving image decoded image IMGdm2 of the 4:2:0 format in the moving image frame buffer circuit 235.

In addition, the moving image region extraction circuit 236 extracts the moving image region MARE2 specified based on the region information UAINF from the moving image decoded image IMGdm2 held in the moving image frame buffer circuit 235. Then, the moving image region extraction circuit 236 transmits the image of the moving image region MARE2 extracted from the moving image decoded image IMGdm2 to the color difference conversion circuit 238.

The color difference conversion circuit 238 converts the color difference format of the image of the moving image region MARE2 received from the moving image region extraction circuit 236 from the 4:2:0 format into the 4:4:4 format. Then, the color difference conversion circuit 238 stores the image of the moving image region MARE2 converted into the 4:4:4 format in the image buffer circuit 260. As a result, the moving image region MARE2 in the moving image decoded image IMGdm2 is overwritten on the image held in the image buffer circuit 260, and the moving image region MARE2 in the image held in the image buffer circuit 260 is updated. That is, the moving image region MARE2 in the image IMGo is updated. Further, the operation of the information processing system 12 when the updated region is switched from the still image region to the moving image region is not limited to the example illustrated in FIG. 8.

Figure 9:
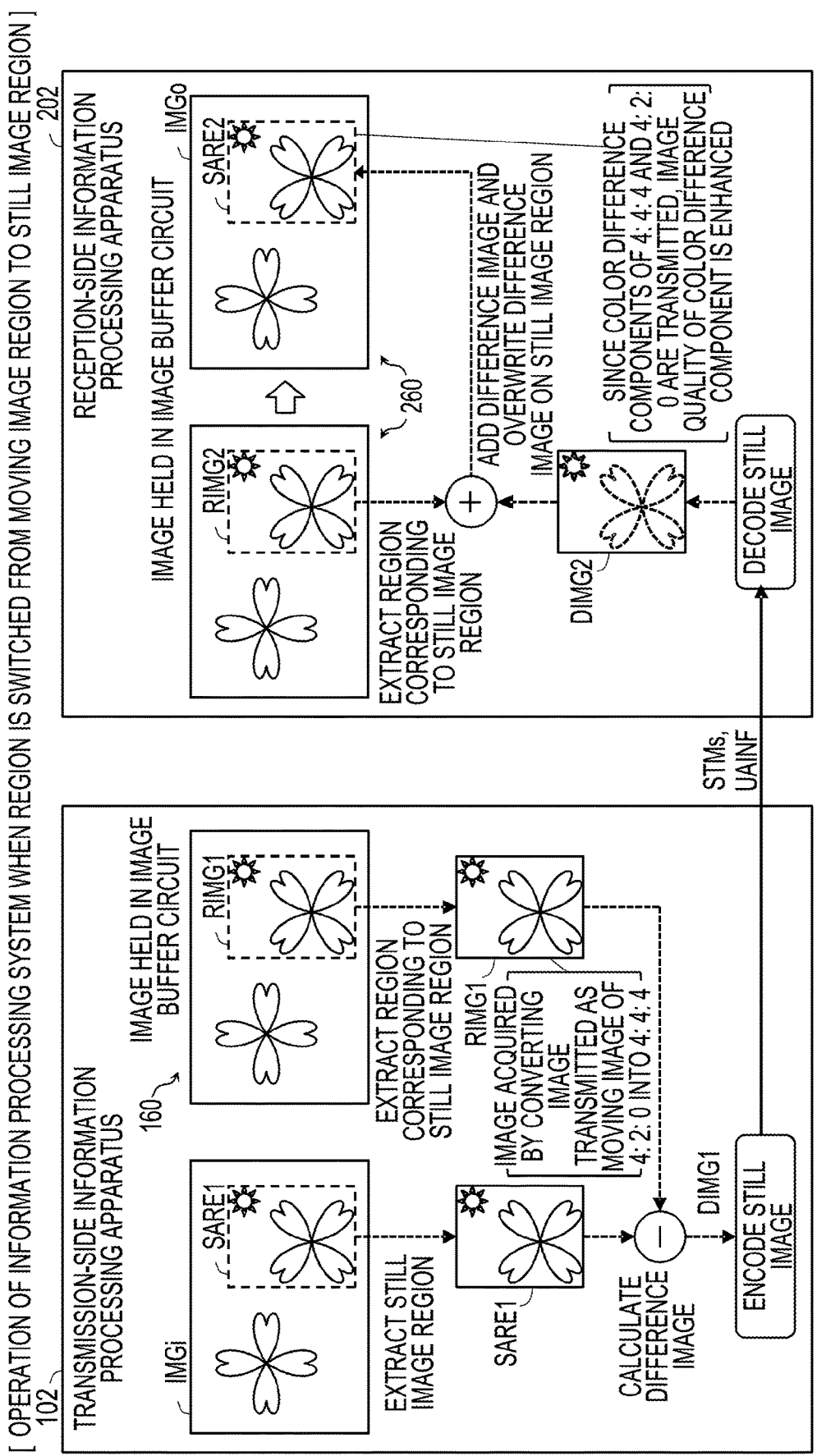
FIG. 9 is a view illustrating another example of the operation of the information processing system illustrated in FIG. 4.

FIG. 9 illustrates yet another example of the operation of the information processing system 12 illustrated in FIG. 4. The operation illustrated in FIG. 9 is the operation of the information processing system 12 when the region is switched from the moving image region to the still image region.

The still image region extraction circuit 144 of the transmission-side information processing apparatus 102 extracts the region SARE1 switched from the moving image region to the still image region from the image IMGi, and transmits the extracted region to the still image difference calculation circuit 146. The still image reference image acquisition circuit 145 acquires the image of the region corresponding to the region SARE1 switched from the moving image region to the still image region, as the reference image RIMG1 from the image held in the image buffer circuit 160. Then, the still image reference image acquisition circuit 145 transmits the reference image RIMG1 to the still image difference calculation circuit 146. Further, the reference image RIMG1 is an image obtained by converting the image transmitted as the moving image of the 4:2:0 format into the 4:4:4 format, and an image in which the color difference components are deteriorated as compared with the image transmitted as the image of the 4:4:4 format.

The still image difference calculation circuit 146 calculates the difference between the still image region SARE1 received from the still image region extraction circuit 144 and the reference image RIMG1 received from the still image reference image acquisition circuit 145 to generate the difference image DIMG1, and transmits the difference image DIMG1 to the still image region encoding circuit 148.

Then, the still image region encoding circuit 148 encodes the difference image DIMG1 to generate the still image stream STMs, and transmits the still image stream STMs to the reception-side information processing apparatus 202 via the transmission circuit 170. In addition, together with the still image stream STMs, the region information UAINF indicating, for example, the position of the region SARE1 switched from the moving image region to the still image region is also transmitted from the information processing apparatus 102 to the information processing apparatus 202.

The still image decoding circuit 252 of the reception-side information processing apparatus 202 decodes the still image stream STMs received from the information processing apparatus 102 to generate the difference image DIMG2. Further, the still image reference image acquisition circuit 245 acquires the image of the region corresponding to the region SARE1 switched from the moving image region to the still image region, as the reference image RIMG2 from the image held in the image buffer circuit 260. Then, the still image reference image acquisition circuit 245 transmits the reference image RIMG2 to the still image decoding circuit 252. The still image decoding circuit 252 adds the difference image DIMG2 obtained by decoding the still image stream STMs and the reference image RIMG2 received from the still image reference image acquisition circuit 245, to generate the still image decoded image of the still image region SARE2 corresponding to the still image region SARE1. Then, the still image decoding circuit 252 stores the still image decoded image of the still image region SARE2 in the image buffer circuit 260. As a result, the still image decoded image of the region SARE2 switched from the moving image region to the still image region is overwritten on the image held in the image buffer circuit 260, so that the region SARE2 switched from the moving image region to the still image region in the image and held in the image buffer circuit 260 is updated. That is, the region SARE2 switched from the moving image region to the still image region in the image IMGo is updated and the difference between the color difference components of 4:4:4 and 4:2:0 is transmitted, so that the image quality of the color difference component is enhanced. Further, the operation of the information processing system 12 when the region is switched from the moving image region to the still image region is not limited to the example illustrated in FIG. 9.

Figure 10:
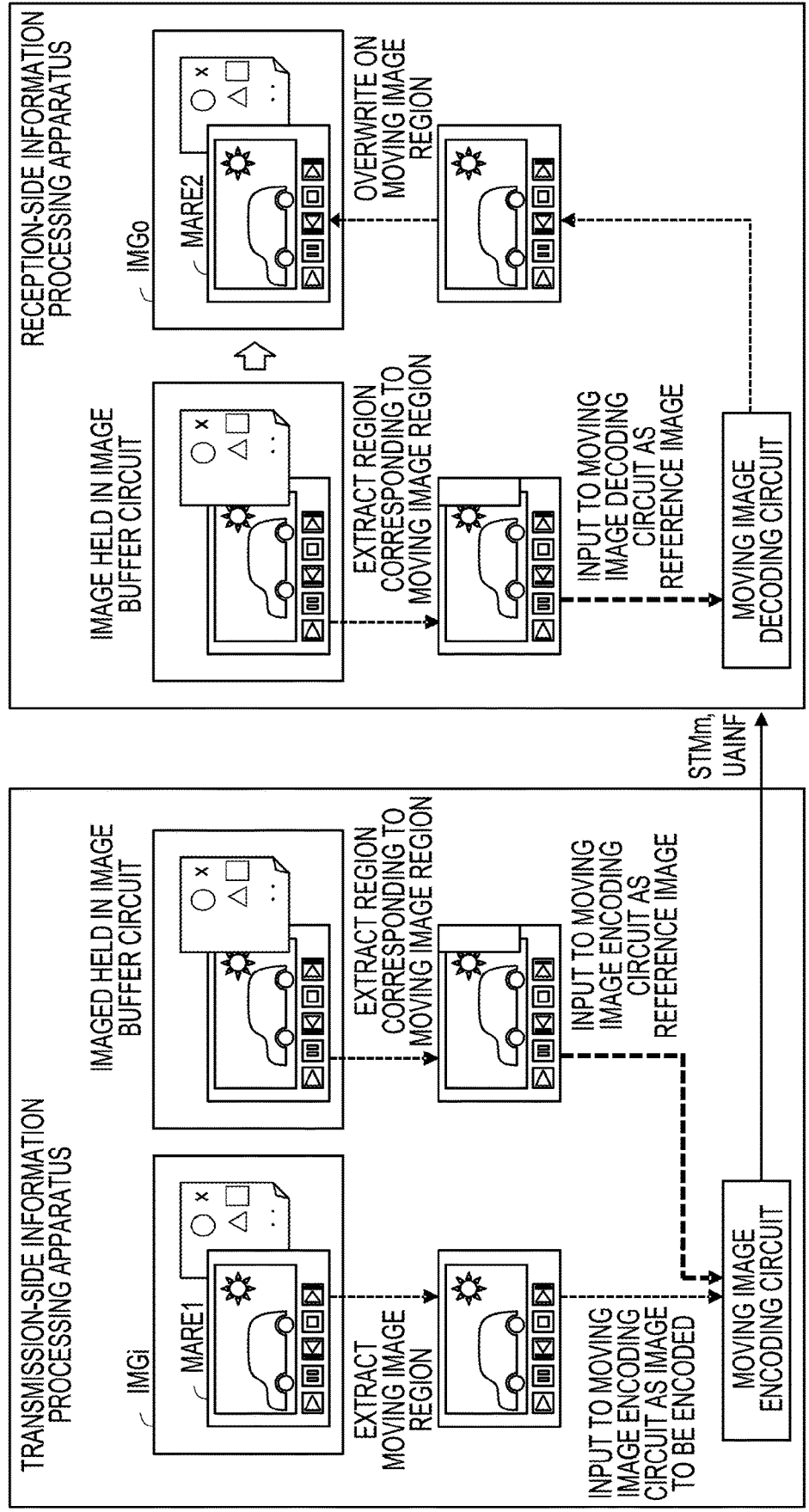
FIG. 10 is a view illustrating a comparative example of the operation of the information processing system illustrated in FIG. 4.

FIG. 10 illustrates a comparative example of the operation of the information processing system 12 illustrated in FIG. 4. The operation illustrated in FIG. 10 is the operation of the information processing system when the region is switched from the still image region to the moving image region. In the operation illustrated in FIG. 10, the moving image encoding apparatus used in the information processing system is designed such that the reference image may be obtained from the outside of the moving image encoding apparatus and the first frame may be encoded by the inter-screen prediction. Further, the moving image decoding apparatus used in the information processing system is designed such that the reference image may be acquired from the outside of the moving image decoding apparatus and the first frame may be encoded.

For example, the transmission-side information processing apparatus extracts the moving image region MARE1 from the image IMGi, and inputs the extracted moving image region MARE1 as an image to be encoded to the moving image encoding apparatus. Further, the transmission-side information processing apparatus extracts the region corresponding to the moving image region MARE1 from the image held in the image buffer circuit 160 (the image of the previous frame of the first frame in the moving image encoding) and inputs the extracted region as the reference image of the moving image encoding to the moving image encoding apparatus. As a result, the moving image encoding apparatus encodes the moving image region MARE1 by the inter-screen prediction using the image of the previous frame of the first frame in the moving image encoding as the reference image to generate the moving image stream STMm. Then, the moving image encoding apparatus transmits the moving image stream STMm and the region information UAINF generated by encoding the moving image region MARE1 by the inter-screen prediction, to the reception-side information processing apparatus.

The reception-side information processing apparatus extracts the region corresponding to the moving image region MARE1 from the image held in the image buffer circuit 260 (the image of the previous frame of the first frame in the moving image encoding), and inputs the extracted region as the reference image of the moving image decoding to the moving image decoding apparatus. Then, the moving image decoding apparatus decodes the moving image stream STMm received from the transmission-side information processing apparatus using the image of the previous frame of the first frame in the moving image encoding as the reference image. As a result, the moving image decoded image of the moving image region MARE2 corresponding to the moving image region MARE1 is generated. Then, the moving image decoding apparatus updates the moving image region MARE2 in the image IMGo by overwriting the moving image decoded image of the moving image region MARE2 on the image held in the image buffer circuit 260.

As described above, the comparative example uses the moving image encoding apparatus capable of encoding the first frame of the moving image by the inter-screen prediction by acquiring the reference image from the outside of the moving image encoding apparatus and the moving image decoding apparatus capable of decoding the inter-screen prediction encoded image by acquiring the reference image from the outside of the moving image decoding apparatus, as indicated by thick dashed lines. In the universal moving image encoding apparatus and moving image decoding apparatus, it is difficult to encode the first frame by the inter-screen prediction and to acquire the image of the previous frame of the first frame in the moving image encoding as the reference image.

Meanwhile, the information processing apparatus 102 illustrated in FIG. 4 encodes the first frame of the image IMGi at the time of starting the screen transmission by the in-screen prediction, and thereafter, encodes the frame of the image IMGi by the inter-screen prediction each time the moving image region is detected. Therefore, it is possible to execute the encoding of the moving image using the universal moving image encoding apparatus, and it is possible to execute the decoding of the moving image stream STMm using the universal moving image decoding apparatus.

Figure 11:
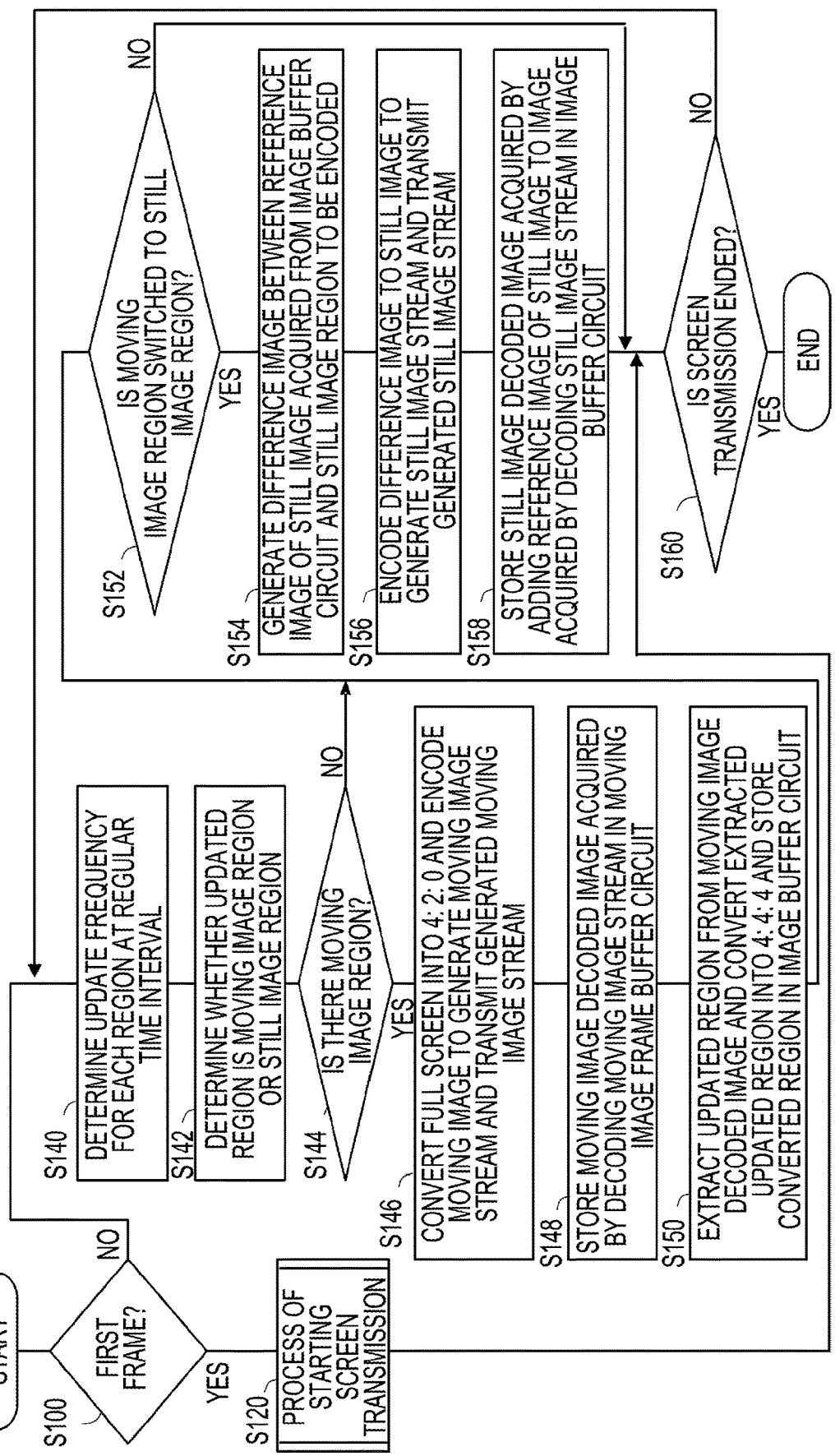
FIG. 11 is a diagram illustrating an example of the operation of the transmission-side information processing apparatus illustrated in FIG. 4.

FIG. 11 illustrates an example of the operation of the transmission-side information processing apparatus 102 illustrated in FIG. 4. The operation illustrated in FIG. 11 is an example of an information processing program for controlling the operation of the transmission-side information processing apparatus 102.

In step S100, the update frequency determination circuit 114 determines whether or not the image IMGi is a first frame. That is, the update frequency determination circuit 114 determines whether or not the image IMGi is an image to be initially displayed by the reception-side information processing apparatus 202. When it is determined that the image IMGi is the first frame, the operation of the information processing apparatus 102 moves to step S120. Meanwhile, when it is determined that the image IMGi is not the first frame, the operation of the information processing apparatus 102 moves to step S140.

In step S120, the information processing apparatus 102 executes the screen transmission starting processing. The screen transmission starting processing is the processing by the information processing apparatus 102 in the processing described in FIG. 7. Details of the screen transmission start processing will be described with reference to FIG. 12. After the screen transmission starting processing is executed, the operation of the information processing apparatus 102 moves to step S160.

In step S140, as described in FIG. 5, the update frequency determination circuit 114 determines the update frequency for each region of the image IMGi at a regular time interval.

In step S142, as described in FIG. 5, the updated region identification circuit 116 determines whether the updated region is a moving image region or a still image region, based on the update frequency.

Next, in step S144, the updated region determination circuit 116 determines whether there is the moving image region. When it is determined that there is the moving image region, the operation of the information processing apparatus 102 moves to step S146. Meanwhile, when it is determined that there is no moving image region, the operation of the information processing apparatus 102 moves to step S152.

In step S146, as described in FIG. 5, the color difference conversion circuit 124 converts the color difference format of the image IMGi into the 4:2:0 format. Then, the full screen moving image encoding circuit 126 encodes the full screen of the image IMGi converted into the 4:2:0 format as the moving image to generate a moving image stream STMm. In addition, the full screen moving image encoding circuit 126 transmits the generated moving image stream STMm to the reception-side information processing apparatus 202 via the transmission circuit 170. The processing of step S146 corresponds to the processing by the information processing apparatus 102 in the processing described in FIG. 8.

Next, in step S148, as described in FIG. 5, the full screen moving image decoding circuit 134 decodes the moving image stream STMm received from the full screen moving image encoding circuit 126 to generate a moving image decoded image of the full screen, and stores the generated moving image decoded image in the moving image frame buffer circuit 135.

Next, in step S150, as described in FIG. 5, the moving image region extraction circuit 136 extracts the moving image region from the moving image decoded image held in the moving image frame buffer circuit 135, and transmits the extracted updated region to the color difference conversion circuit 138. Then, the color difference conversion circuit 138 converts the color difference format of the updated region received from the moving image region extraction circuit 136 into the 4:4:4 format, and stores the image of the updated region converted into the 4:4:4 format in the image buffer circuit 160. As a result, the moving image region in the image held in the image buffer circuit 160 is updated. After the processing of step S150 is executed, the operation of the information processing apparatus 102 moves to step S152.

In step S152, the updated region determination circuit 116 determines whether there is the updated region that has been converted from the moving image region into the still image region. When it is determined that there is the updated region that has been converted from the moving image region into the still image region, the operation of the information processing apparatus 102 moves to step S154. Meanwhile, when it is determined that there is the updated region that has been converted from the moving image region into the still image region, the operation of the information processing apparatus 102 moves to step S160.

In step S154, as described in FIG. 5, the still image difference calculation circuit 146 generates a difference image DIMG1 between the reference image RIMG1 of the still image acquired from the image buffer circuit 160 through the still image reference image acquisition circuit 145 and the still image region SARE1 to be encoded. Further, the still image region SARE1 to be encoded is extracted from the image IMGi by the still image region extraction circuit 144 and transmitted to the still image difference calculation circuit 146.

Next, in step S156, as described in FIG. 5, the still image region encoding circuit 148 encodes the difference image DIMG1 as a still image to generate a still image stream STMs, and transmits the generated still image stream STMs to the reception-side information processing apparatus 202 through the transmission circuit 170. A series of processing in steps S154 and S156 corresponds to the processing by the information processing apparatus 102 in the processing described in FIG. 8.

Next, in step S158, as described in FIG. 5, the still image decoding circuit 152 adds the reference image RIMG1 of the still image to the image obtained by decoding the still image stream STMs received from the still image region encoding circuit 148 to generate a still image decoded image. Then, the still image decoding circuit 152 stores the generated still image decoded image in the image buffer circuit 160. As a result, the still image region in the image held in the image buffer circuit 160 is updated. After the processing of step S158 is executed, the operation of the information processing apparatus 102 moves to step S160.

In step S160, the information processing apparatus 102 determines whether the screen transmission to the information processing apparatus 202 is ended. When it is determined that the screen transmission to the information processing apparatus 202 is not ended, the operation of the information processing apparatus 102 returns to step S140. Meanwhile, when it is determined that the screen transmission to the information processing apparatus 202 is ended, the operation of the information processing apparatus 102 is ended. Further, the operation of the information processing apparatus 102 is not limited to the example illustrated in FIG. 11.

Figure 12:
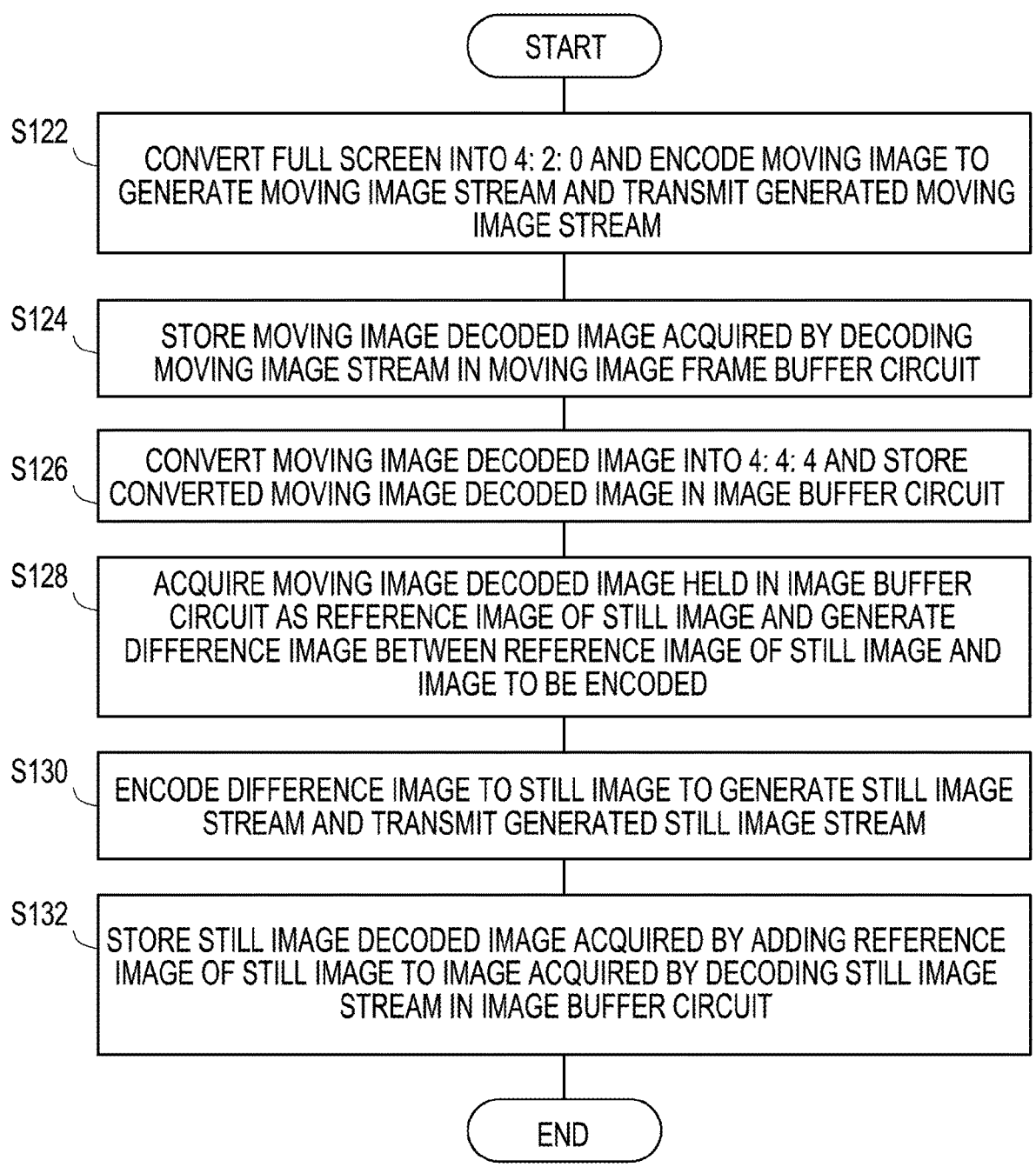
FIG. 12 is a diagram illustrating an example of a screen transmission starting processing illustrated in FIG. 11.

FIG. 12 illustrates an example of the screen transmission starting processing illustrated in FIG. 11. The processing of step S122 illustrated in FIG. 12 is executed when it is determined in step S100 illustrated in FIG. 11 that the image IMGi is the first frame.

In step S122, the color difference conversion circuit 124 converts the color difference format of the image IMGi into the 4:2:0 format as described in FIG. 7. Then, the full screen moving image encoding circuit 126 encodes the full screen of the image IMGi converted into the 4:2:0 format as the moving image to generate a moving image stream STMm. In addition, the full screen moving image encoding circuit 126 transmits the generated moving image stream STMm to the reception-side information processing apparatus 202 via the transmission circuit 170.

Next, in step S124, as described in FIG. 7, the full screen moving image decoding circuit 134 decodes the moving image stream STMm received from the full screen moving image encoding circuit 126 to generate a moving image decoded image IMGdm1 of the full screen. Then, the full screen moving image decoding circuit 134 stores the moving image decoded image IMGdm1 generated by decoding the moving image stream STMm in the moving image frame buffer circuit 135.

Next, in step S126, as described in FIG. 7, the color difference conversion circuit 138 converts the color difference format of the moving image decoded image IMGdm1 acquired from the moving image frame buffer circuit 135 into the 4:4:4 format. Then, the color difference conversion circuit 138 stores the moving image decoded image IMGdm1 of the full screen converted into the 4:4:4 format in the image buffer circuit 160.

Next, in step S128, as described in FIG. 7, the still image reference image acquisition circuit 145 acquires the moving image decoded image IMGdm1 held in the image buffer circuit 160 as a reference image of the still image. Then, the still image difference calculation circuit 146 calculates the difference between the moving image decoded image IMGdm1 received from the still image reference image acquisition circuit 145 as the reference image of the still image and the full screen of the image IMGi to be encoded received from the still image region extraction circuit 144 to generate a difference image.

Next, in step S130, as described in FIG. 7, the still image region encoding circuit 148 encodes the difference image generated in step S128 as the still image to generate a still image stream STMs. Then, the still image region encoding circuit 148 transmits the still image stream STMs to the reception-side information processing apparatus 202 via the transmission circuit 170.

Next, in step S132, the still image decoding circuit 152 adds the reference image of the still image to the difference image obtained by decoding the still image stream STMs received from the still image region encoding circuit 148 to generate a still image decoded image. Then, the still image decoding circuit 152 stores the generated still image decoded image in the image buffer circuit 160. As a result, the image buffer circuit 160 holds the same image as the image to be initially displayed by the reception-side information processing apparatus 202. When the processing of step S132 is ended, the screen transmission starting processing is ended, and the operation of the information processing apparatus 102 moves to step S160 illustrated in FIG. 11.

Further, the screen transmission starting processing is not limited to the example illustrated in FIG. 12.

Figure 13:
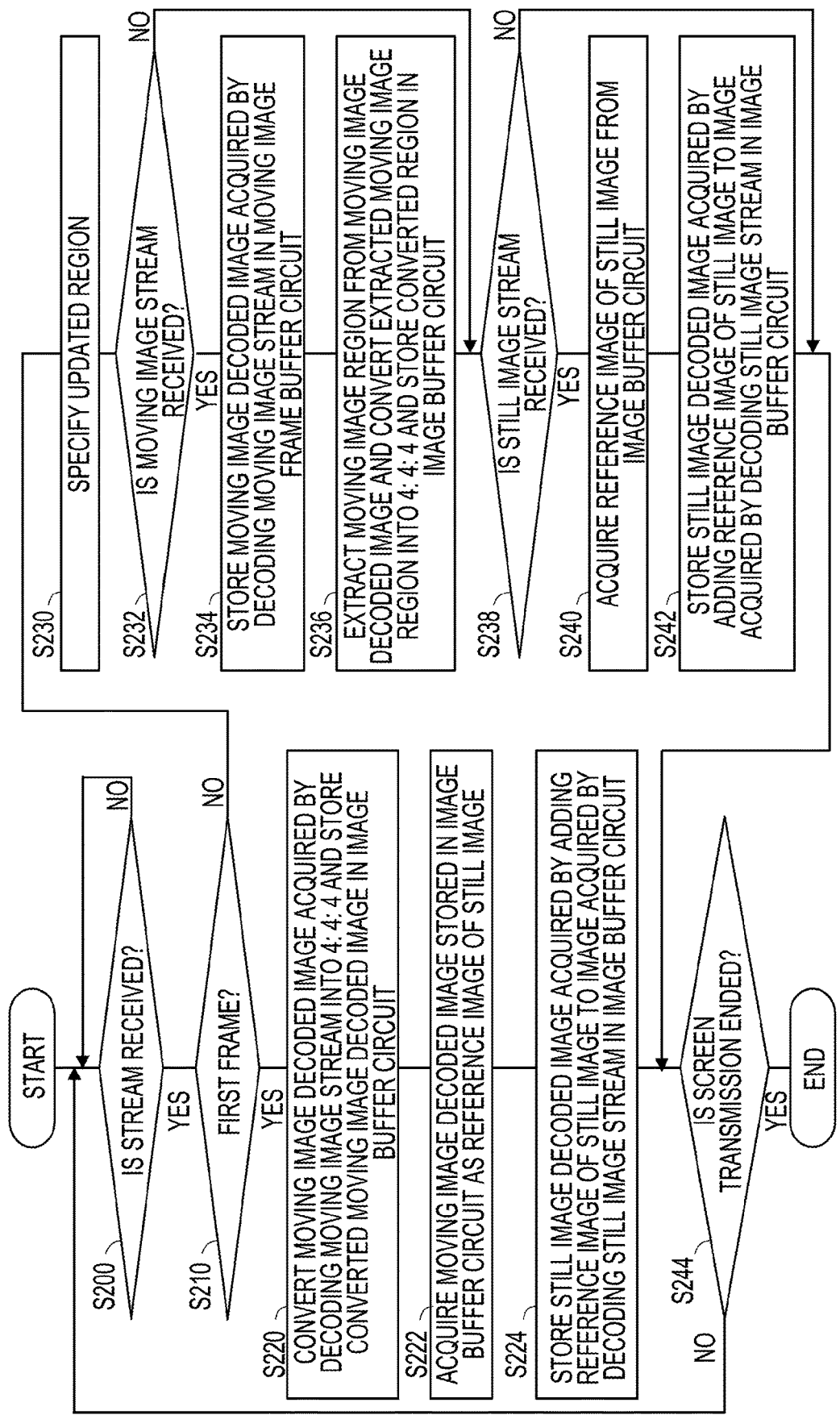
FIG. 13 is a diagram illustrating an example of the operation of the reception-side information processing apparatus illustrated in FIG. 4.

FIG. 13 illustrates an example of the operation of the reception-side information processing apparatus 202 illustrated in FIG. 4. The operation illustrated in FIG. 13 is an example of an information processing program for controlling the operation of the reception-side information processing apparatus 202.

In step S200, the reception circuit 210 determines whether or not a stream such as the moving image stream STMm or the still image stream STMs has been received from the transmission-side information processing apparatus 102. For example, the reception circuit 210 confirms whether or not the stream such as the moving image stream STMm or the still image stream STMs is held in a reception buffer circuit (not illustrated in, for example, FIGS. 4 and 6) of the reception circuit 210 so as to determine whether the stream has been received. When it is determined that the stream has been received, the information processing apparatus 202 moves the operation to step S210. Meanwhile, when it is determined that the stream has not been received, the information processing apparatus 202 returns the operation to step S200. That is, the information processing apparatus 202 waits for the processing after step S210 until the stream is received.

In step S210, the reception circuit 210 determines whether or not the stream received from the information processing apparatus 102 (the moving image stream STMm or the still image stream STMs) is a stream of the first frame (an image to be initially displayed on the information processing apparatus 202). When it is determined that the stream received from the information processing apparatus 102 is the stream of the first frame, the operation of the information processing apparatus 202 moves to step S220. Meanwhile, when it is determined that the stream received from the information processing apparatus 102 is not the stream of the first frame, that is, when the stream is a stream for updating the display content of the image IMGo already displayed on the information processing apparatus 202, the operation of the information processing apparatus 202 moves to step S230.

In step S220, the full screen moving image decoding circuit 234 decodes the moving image stream STMm received from the reception circuit 210 to generate a moving image decoded image IMGdm2 of the full screen. Then, the full screen moving image decoding circuit 234 stores the moving image decoded image IMGdm2 generated by decoding the moving image stream STMm in the moving image frame buffer circuit 235. In addition, the color difference conversion circuit 238 converts the color difference format of the moving image decoded image IMGdm2 acquired from the moving image frame buffer circuit 235 via the moving image region extraction circuit 236 into the 4:4:4 format. In addition, the color difference conversion circuit 238 stores the moving image decoded image IMGdm2 of the full screen converted into the 4:4:4 format in the image buffer circuit 260.

Next, in step S222, as described in FIG. 7, the still image reference image acquisition circuit 245 acquires the moving image decoded image IMGdm2 held in the image buffer circuit 260 as a reference image of the still image.

Next, in step S224, the still image decoding circuit 252 adds the moving image decoding image IMGdm2 received from the still image reference image acquisition circuit 245 as a reference image to the image obtained by decoding the still image stream STMs received from the reception circuit 210 to generate a still image decoded image. Then, the still image decoding circuit 252 stores the still image decoded image generated by decoding the still image stream STMs of the first frame, in the image buffer circuit 260. As a result, the first image IMGo is displayed on the information processing device 202. After the processing of step S224 is executed, the operation of the information processing apparatus 202 moves to step S244. Further, as described above, the processing of step S230 is executed on a stream of a subsequent frame.

In step S230, as described in FIG. 4, the updated region specifying circuit 212 specifies, for example, the position of the moving image region and the position of the region switched from the moving image region to the still image region, based on the region information UAINF.

Next, in step S232, the reception circuit 210 determines whether or not the moving image stream STMm has been received from the information processing apparatus 102. When it is determined that the moving image stream STMm has been received, the information processing apparatus 202 moves the operation to step S234. When it is determined that the moving image stream STMm has not been received, the information processing apparatus 202 moves the operation to step S238.

Next, in step S234, as described in FIG. 6, the full screen moving image decoding circuit 234 decodes the moving image stream STMm received from the reception circuit 210 to generate a moving image decoded image IMGdm2 of the full screen, and stores the generated moving image decoded image IMGdm2 in the moving image frame buffer circuit 235.

Next, in step S236, as described in FIG. 6, the moving image region extraction circuit 236 extracts a moving image region MARE2 (the region specified in step S230) from the moving image decoded image IMGdm2 held in the moving image frame buffer circuit 235. Then, the moving image region extraction circuit 236 transmits the moving image region MARE2 extracted from the moving image decoded image IMGdm2 to the color difference conversion circuit 238. Further, the color difference conversion circuit 238 converts the color difference format of the moving image region MARE2 received from the moving image region extraction circuit 236 into the 4:4:4 format, and stores the image of the moving image region MARE2 converted into the 4:4:4 format in the image buffer circuit 260. As a result, the moving image region MARE2 in the image held in the image buffer circuit 260 is updated. After the processing of step S236 is executed, the operation of the information processing apparatus 202 moves to step S238.

In step S238, the reception circuit 210 determines whether or not the still image stream STMs has been received from the information processing apparatus 102. When it is determined that the still image steam STMs has been received, the information processing apparatus 202 moves the operation to step S240. Meanwhile, when it is determined that the still image stream STMs has not been received, the information processing apparatus 202 moves the operation to step S244.

In step S240, as described in FIG. 9, the still image reference image acquisition circuit 245 acquires an image of the region corresponding to the still image region SARE1 (the region specified in step S230) from the image held in the image buffer circuit 260 as a reference image RIMG2 of the still image.

In step S242, the still image decoding circuit 252 adds the reference image RIMG2 received from the still image reference image acquisition circuit 245 to the image obtained by decoding the still image stream STMs received from the reception circuit 210, to generate a still image decoded image of a still image region SARE2. Then, the still image decoding circuit 252 stores the still image decoded image of the still image region SARE2 in the image buffer circuit 260. As a result, the still image decoded image of the still image region SARE2 is overwritten on the image held in the image buffer circuit 260, and the still image region SARE2 in the image held in the image buffer circuit 260 is updated. That is, the still image region SARE2 in the image IMGo is updated. After the processing of step S242 is executed, the operation of the information processing apparatus 202 moves to step S244.

In step S244, the information processing apparatus 202 determines whether the screen transmission from the information processing apparatus 102 is ended. When it is determined that the screen transmission from the information processing apparatus 102 is not ended, the operation of the information processing apparatus 202 returns to step S200. Meanwhile, when it is determined that the screen transmission from the information processing apparatus 102 is ended, the operation of the information processing apparatus 202 is ended. Further, the operation of the information processing apparatus 202 is not limited to the example illustrated in FIG. 13.

As described above, the same effect as that in the embodiment illustrated in FIGS. 1 to 3 may also be obtained in the embodiment illustrated in FIGS. 4 to 13. For example, when the moving image region is present in the image IMGi, the information processing apparatus 102 encodes the full screen (full frame) of the image IMGi as the moving image to generate the moving image stream STMm, and transmits the moving image stream STMm to the reception-side information processing apparatus 202. Further, when there is the region switched from the moving image region to the still image region, the information processing apparatus 102 encodes the region switched from the moving image region to the still image region to generate the still image stream STMs, and transmits the still image stream STMs to the reception-side information processing apparatus 202.

As described above, since the information processing apparatus 102 encodes the full screen (full frame) of the image IMGi as a moving image when a moving image region is present in the image IMGi, and temporarily stops the encoding when no moving image region is present, the information processing apparatus 102 may restart the decoding operation even in a case where the still image region is switched to the moving image region, and as a result, it is possible to encode the first frame switched to the moving image region by the inter-screen prediction. Also, since the difference from the previous frame (or, the reference image inside the encoding device) is relatively small in the region other than the moving image region in the frame, a difference in information amount between the case where only the moving image region is encoded and the case where the full screen is encoded is relatively small. Therefore, when the updated region is converted from the still image region to the moving image region, the information processing apparatus 102 may suppress an increase in information amount generated by the encoding of an image. That is, when the still image encoding is converted to the moving image encoding, it is possible to suppress an increase in information amount generated by the encoding of an image.

Further, since the region converted from the still image region to the moving image region is encoded as the moving image region immediately until the region is converted to the still image region, the reference image of the first frame converted to the moving image region is held in the image buffer in the moving image encoding apparatus. As a result, the universal moving image encoding apparatus of which the internal operation is not changeable may be used in the full screen moving image encoding circuit 126 and the full screen moving image decoding circuit 134. That is, even when the universal moving image encoding apparatus of which the internal operation is not changeable is used in the full screen moving image encoding circuit 126, it is possible to suppress the increase in information amount generated by the encoding of an image when the updated region is converted from the still image region to the moving image region.

Further, in the information processing apparatus 102, when the image IMGo to be initially displayed on the reception-side information processing apparatus 202 is transmitted, the moving image encoding circuit 122 encodes the full screen of the image IMGi converted into the 4:2:0 format by the inter-screen prediction to generate the moving image stream STMm. Then, the still image encoding circuit 142 encodes the image IMGi as a still image using the image obtained by converting the moving image decoded image IMGdm1 obtained by decoding the moving image stream STMm into the 4:4:4 format as a reference image, to generate a still image stream STMs. As a result, the information processing apparatus 102 may suppress an increase in the information amount of the moving image stream STMm and the still image stream STMs (the amount of information to be transmitted to the information processing apparatus 202) at the time of starting the screen transmission.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing system comprising:
a transmission-side information processing apparatus configured to encode an image and transmit an encoded image, the transmission-side information processing apparatus including:
a first image buffer circuit configured to hold the image,
an updated region determination circuit configured to determine whether an updated region in which a display content has been updated is present in the image based on a difference between a frame to be determined and a previous frame of the frame to be determined for each frame of the image and determine the inside of the frame to be determined as a moving image region and a still image region based on the update region,
a moving image encoding circuit configured to encode the frame of the image that includes the moving image region and the still image region by a moving image encoding scheme to generate a moving image stream when there is the moving image region in the frame to be determined,
a still image encoding circuit configured to encode a region switched from the moving image region to the still image region to generate a still image stream when there is the region switched from the moving image region to the still image region in the frame to be determined, a first moving image decoding circuit configured to generate a decoded moving image by decoding the moving image stream, and extract a region corresponding to the moving image region from the decoded moving image generated by decoding the moving image stream and store the image of the extracted region in the first image buffer circuit when there is the moving image region in the frame to be determined, a first still image decoding circuit configured to generate a decoded still image of the region switched from the moving image region to the still image region by decoding the still image stream and store the decoded still image in the first image buffer circuit, and a transmission circuit configured to transmit region information that indicates the moving image region and transmit the moving image stream to the reception-side information processing apparatus when there is the moving image region in the frame to be determined and transmit region information that indicates the region switched from the moving image region to the still image region and the still image stream to the reception-side information processing apparatus when there is the region switched from the moving image region to the still image region in the frame to be determined; and a reception-side information processing apparatus configured to decode the encoded image received from the transmission-side information processing apparatus and display decoded image on a display screen, the reception-side information processing apparatus including:

a second image buffer circuit configured to hold the image displayed on the display screen, a second moving image decoding circuit configured to generate the decoded moving image by decoding the moving image stream received from the transmission-side information processing apparatus, and extract the region corresponding to the moving image region from the decoded moving image generated by decoding the moving image stream based on the region information received from the transmission-side information processing apparatus when there is the moving image region in the decoded moving image and store the image of the extracted region in the second image buffer circuit, and a second still image decoding circuit configured to generate the decoded still image of the region switched from the moving image region to the still image region by decoding the still image stream received from the transmission-side information processing apparatus and store the decoded still image in the second image buffer circuit.

2. The information processing system according to claim 1, wherein the still image encoding circuit, when there is the region switched from the moving image region to the still image region in the frame to be determined, acquires as a first reference image an image of a region corresponding to the region switched from the moving image region to the still image region from the image held in the first image buffer circuit and encodes a difference between the first reference image and the image of the region switched from the moving image region to the still image region to generate the still image stream, and the first still image decoding circuit, when there is the region switched from the moving image region to the still image region in the frame to be determined, adds the image obtained by decoding the still image stream to the first reference image to generate the decoded still image of the region switched from the moving image region to the still image region and stores the decoded still image in the first image buffer circuit.

3. The information processing system according to claim 1, wherein when the second still image decoding circuit receives the still image stream from the transmission-side information processing apparatus, the second still image decoding circuit acquires the image of the region corresponding to the region switched from the moving image region to the still image region from the image held in the second image buffer circuit as a second reference image and adds the image acquired by decoding the still image stream to the second reference image to generate the decoded still image of the region switched from the moving image region to the still image region and stores the decoded still image in the second image buffer circuit.

4. The information processing system according to claim 1, wherein a color difference format of the image to be encoded, which is encoded by the transmission-side information processing apparatus is a 4:4:4 format in which color difference components are not extracted, the still image encoding circuit encodes the region switched from the moving image region to the still image region in the image to be encoded, which has the 4:4:4 format to generate the still image stream, the moving image encoding circuit converts the image to be encoded, which has the 4:4:4 format into an image in which the color difference components are extracted and encodes the frame of the image in which the color difference components are extracted by the moving image encoding scheme to generate the moving image stream, and the first moving image decoding circuit extracts the image of the region corresponding to the moving image region in the decoded moving image generated by decoding the moving image stream, and converts the color difference format of the extracted image into the 4:4:4 format and stores the image converted into the 4:4:4 format in the first image buffer circuit.

5. The information processing system according to claim 4, wherein when the transmission-side information processing apparatus transmits an image to be initially displayed in the reception-side information processing apparatus, the first moving image decoding circuit converts the color difference format of the decoded moving image generated by decoding the moving image stream into the 4:4:4 format and stores the decoded moving image converted into the 4:4:4 format in the first image buffer circuit, the still image encoding circuit acquires the decoded moving image held in the first image buffer circuit as a third reference image, and encodes a difference between the third reference image and the image to be encoded to generate the still image stream, and the first still image decoding circuit adds the image acquired by decoding the still image stream to the third reference image to generate the decoded still image and stores the decoded still image in the first image buffer circuit.

6. The information processing system according to claim 5, wherein when the reception-side information processing apparatus initially displays the image,
the second moving image decoding circuit converts the color difference format of the decoded moving image generated by decoding the moving image stream received from the transmission-side information processing apparatus into the 4:4:4 format and stores the decoded moving image converted into the 4:4:4 format in the second image buffer circuit, and
the second still image decoding circuit acquires the decoded moving image held in the second image buffer circuit as a fourth reference image, adds the image acquired by decoding the still image stream received from the transmission-side information processing apparatus to the fourth reference image to generate the decoded still image, and stores the decoded still image in the second image buffer circuit.

7. The information processing system according to claim 1, wherein the transmission-side information processing apparatus also includes a first moving image frame buffer circuit holding the image of the frame of the moving image,
the first moving image decoding circuit generates the decoded moving image by decoding the moving image stream each time the moving image encoding circuit generates the moving image stream and stores the decoded moving image in the first moving image frame buffer circuit,
the reception-side information processing apparatus also includes a second moving image frame buffer circuit holding the image of the frame of the moving image, and
the second moving image decoding circuit generates the decoded moving image by decoding the moving image stream each time the moving image stream is received from the transmission-side information processing apparatus and stores the decoded moving image in the second moving image frame buffer circuit.

8. A transmission-side information processing apparatus for encoding an image and transmitting encoded image to a reception-side information processing apparatus, the transmission-side information processing apparatus comprising:
a first image buffer circuit configured to hold the image;
an updated region determination circuit configured to determine whether an updated region in which a display content has been updated is present in the image based on a difference between a frame to be determined and a previous frame of the frame to be determined for each frame of the image and determine the inside of the frame to be determined as a moving image region and a still image region based on the updated region;
a moving image encoding circuit configured to encode the frame of the image that includes the moving image region and the still image region by a moving image encoding scheme to generate a moving image stream when there is the moving image region in the frame to be determined;
a still image encoding circuit configured to encode a region switched from the moving image region to the still image region to generate a still image stream when there is the region switched from the moving image region to the still image region in the frame to be determined;
a first moving image decoding circuit configured to generate a decoded moving image by decoding the moving image stream, and extract a region corresponding to the moving image region from the decoded moving image generated by decoding the moving image stream and store the image of the extracted region in the first image buffer circuit when there is the moving image region in the frame to be determined;
a first still image decoding circuit configured to generate a decoded still image of the region switched from the moving image region to the still image region by decoding the still image stream and store the decoded still image in the first image buffer circuit; and
a transmission circuit configured to transmit region information indicating the moving image region and the moving image stream to the reception-side information processing apparatus when there is the moving image region in the frame to be determined and transmit region information indicating the region switched from the moving image region to the still image region and the still image stream to the reception-side information processing apparatus when there is the region switched from the moving image region to the still image region in the frame to be determined.

9. A reception-side information processing apparatus for decoding an encoded image received from a transmission-side information processing apparatus and displaying the decoded image on a display screen, the reception-side information processing apparatus comprising:
a second image buffer circuit configured to hold an image displayed on the display screen;
a second moving image decoded circuit configured to generate a decoded moving image that includes a moving image region and a still image region by decoding a moving image stream received from the transmission-side information processing apparatus, and extract a region corresponding to the moving image region from the decoded moving image generated by decoding the moving image stream based on region information which is information received from the transmission-side information processing apparatus and indicates a moving image region when there is the moving image region in the decoded moving image and store the image of the extracted region in the second image buffer circuit; and
a second still image decoding circuit configured to generate a decoded still image of the region switched from the moving image region to the still image region by decoding a still image stream received from the transmission-side information processing apparatus and store the decoded still image in the second image buffer circuit.

10. A non-transitory computer-readable recording medium having stored therein a program for causing a computer in a transmission-side information processing apparatus including a first image buffer circuit to execute a process, the process comprising:
determining whether an updated region in which a display content has been updated is present in an image based on a difference between a frame to be determined and a previous frame of the frame to be determined for each frame of the image;
determining the inside of the frame to be determined as a moving image region and a still image region based on the update region;
encoding the frame of the image that includes the moving image region and the still image region by a moving image encoding scheme and generating a moving image stream when there is the moving image region in the frame to be determined;

encoding a region switched from the moving image region to the still image region and generating a still image stream when there is the region switched from the moving image region to the still image region in the frame to be determined;

generating a decoded moving image by decoding the moving image stream, extracting a region corresponding to the moving image region from the decoded moving image generated by decoding the moving image stream and storing the image of the extracted region in the first image buffer circuit of the transmission-side information processing apparatus, when there is the moving image region in the frame to be determined;

generating a decoded still image of the region switched from the moving image region to the still image region by decoding the still image stream and storing the decoded still image in the first image buffer circuit;

transmitting region information indicating the moving image region and transmitting the moving image stream to a reception-side information processing apparatus when there is the moving image region in the frame to be determined; and transmitting region information indicating the region switched from the moving image region to the still image region and the still image stream to the reception-side information processing apparatus, when there is the region switched from the moving image region to the still image region in the frame to be determined.

11. A non-transitory computer-readable recording medium having stored therein a program for causing a computer in a reception-side information processing apparatus including a second image buffer circuit to execute a process, the process comprising:

generating a decoded moving image that includes a moving image region and a still image region by decoding a moving image stream received from a transmission-side information processing apparatus;

extracting a region corresponding to the moving image region from the decoded moving image generated by decoding the moving image stream based on region information received from the transmission-side information processing apparatus when there is the moving image region in the decoded moving image;

storing the image of the extracted region in a second image buffer circuit;

generating a decoded still image of the region switched from the moving image region to the still image region by decoding a still image stream received from the transmission-side information processing apparatus; and storing the decoded still image in the second image buffer circuit.

* * * * *